(12) United States Patent
Sugizaki et al.

(10) Patent No.: US 10,854,910 B2
(45) Date of Patent: Dec. 1, 2020

(54) SOLID ELECTROLYTE SEPARATOR, SECONDARY BATTERY, BATTERY PACK, AND VEHICLE

(71) Applicant: KABUSHIKI KAISHA TOSHIBA, Minato-ku (JP)

(72) Inventors: Tomoko Sugizaki, Kawasaki (JP); Takashi Kishi, Yokosuka (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 401 days.

(21) Appl. No.: 15/907,781

(22) Filed: Feb. 28, 2018

(65) Prior Publication Data

US 2019/0088982 A1    Mar. 21, 2019

(30) Foreign Application Priority Data

Sep. 20, 2017  (JP) .................... 2017-180617

(51) Int. Cl.
*H01M 6/18* (2006.01)
*H01M 10/0525* (2010.01)
(Continued)

(52) U.S. Cl.
CPC ......... *H01M 10/0525* (2013.01); *B60L 53/00* (2019.02); *H01M 2/1077* (2013.01); *H01M 2/14* (2013.01); *H01M 4/485* (2013.01); *H01M 8/1246* (2013.01); *H01M 10/056* (2013.01); *H01M 10/0562* (2013.01); *H01M 10/425* (2013.01); *H01M 10/46* (2013.01); *H02J 7/14* (2013.01); *B60L 7/10* (2013.01); *H01M 2004/027* (2013.01); *H01M 2220/20* (2013.01);
(Continued)

(58) Field of Classification Search
CPC ........... H01M 10/0525; H01M 10/052; H01M 10/056; H01M 10/0562; H01M 10/425; H01M 10/46; H01M 2/1077; H01M 2/14; H01M 4/485; H01M 8/1246; H01M 2004/027; H01M 2220/20; H01M 2300/0071; H01M 2300/0082; H01M 2300/0091; B60L 53/00; B60L 7/10; H02J 7/14
See application file for complete search history.

(56) References Cited

U.S. PATENT DOCUMENTS

2004/0265663 A1  12/2004  Badding et al.
2009/0136830 A1   5/2009  Gordon
(Continued)

FOREIGN PATENT DOCUMENTS

JP          5-74466 A      3/1993
JP          5-314995 A    11/1993
(Continued)

*Primary Examiner* — Raymond Alejandro
(74) *Attorney, Agent, or Firm* — Oblon, McClelland, Maier & Neustadt, L.L.P.

(57) ABSTRACT

According to one embodiment, a solid electrolyte separator is provided. The solid electrolyte separator is a sheet containing a solid electrolyte having a lithium ion conductivity. A first lithium ion conductivity in a peripheral edge region along an in-plane direction of the sheet is lower than a second lithium ion conductivity in a central region along the in-plane direction of the sheet.

12 Claims, 10 Drawing Sheets

(51) Int. Cl.
  *H01M 2/10* (2006.01)
  *H01M 4/485* (2010.01)
  *H01M 10/42* (2006.01)
  *H01M 10/46* (2006.01)
  *H01M 10/0562* (2010.01)
  *H02J 7/14* (2006.01)
  *B60L 53/00* (2019.01)
  *H01M 8/1246* (2016.01)
  *H01M 2/14* (2006.01)
  *H01M 10/056* (2010.01)
  *B60L 7/10* (2006.01)
  *H01M 4/02* (2006.01)

(52) U.S. Cl.
  CPC ............. *H01M 2300/0071* (2013.01); *H01M 2300/0082* (2013.01); *H01M 2300/0091* (2013.01)

(56) References Cited

U.S. PATENT DOCUMENTS

| | | |
|---|---|---|
| 2013/0171497 A1 | 7/2013 | Enomoto et al. |
| 2015/0357672 A1 | 12/2015 | Hong et al. |
| 2016/0190640 A1 | 6/2016 | Visco et al. |
| 2016/0226067 A1* | 8/2016 | Harada ............... C01G 31/006 |
| 2016/0285066 A1 | 9/2016 | Sakaguchi et al. |
| 2017/0077510 A1 | 3/2017 | Zhang et al. |
| 2018/0277882 A1 | 9/2018 | Sugizaki et al. |

FOREIGN PATENT DOCUMENTS

| | | |
|---|---|---|
| JP | 09-045372 | 2/1997 |
| JP | 9-306543 A | 11/1997 |
| JP | 2003-257489 A | 9/2003 |
| JP | 2007-273349 A | 10/2007 |
| JP | 2011-44369 A | 3/2011 |
| JP | 2012-064448 | 3/2012 |
| JP | 2016-146338 A | 8/2016 |
| JP | 2016-181465 | 10/2016 |
| JP | 2017-016812 | 1/2017 |
| JP | 2018-156899 A | 10/2018 |

* cited by examiner

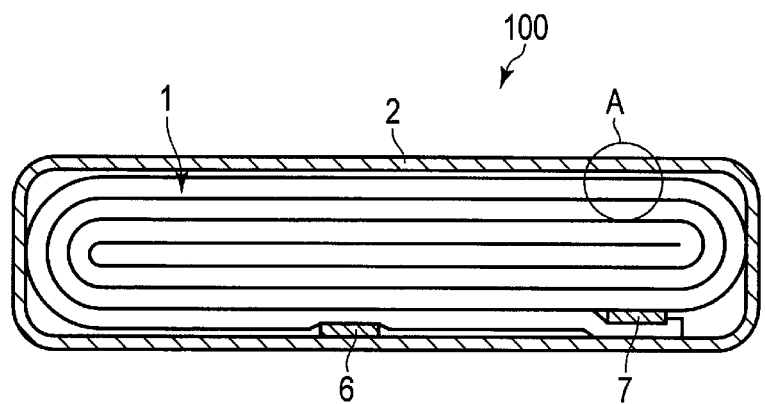
F I G. 10
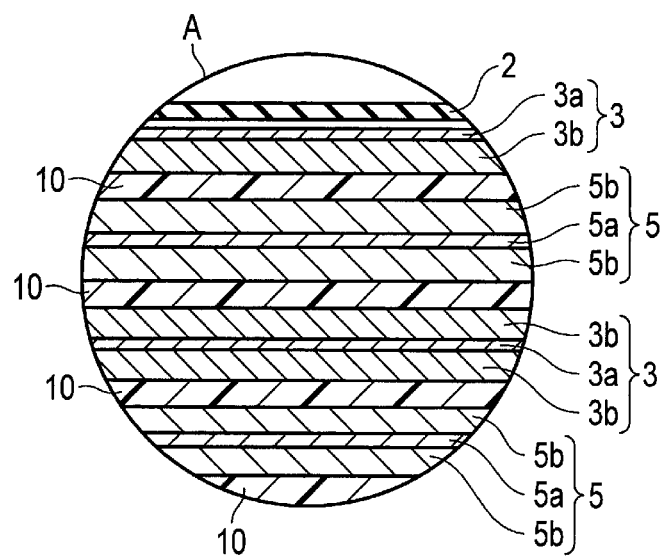
F I G. 11

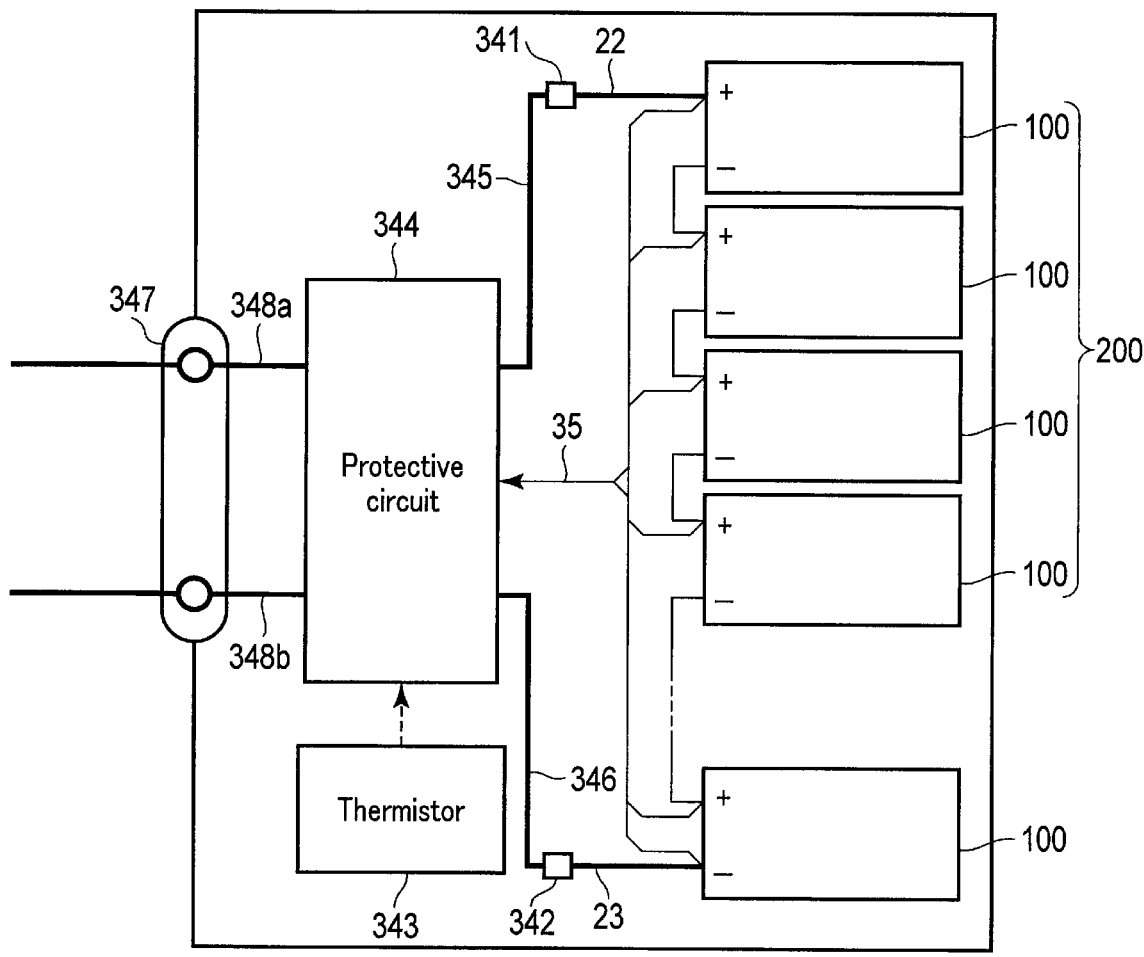
F I G. 14
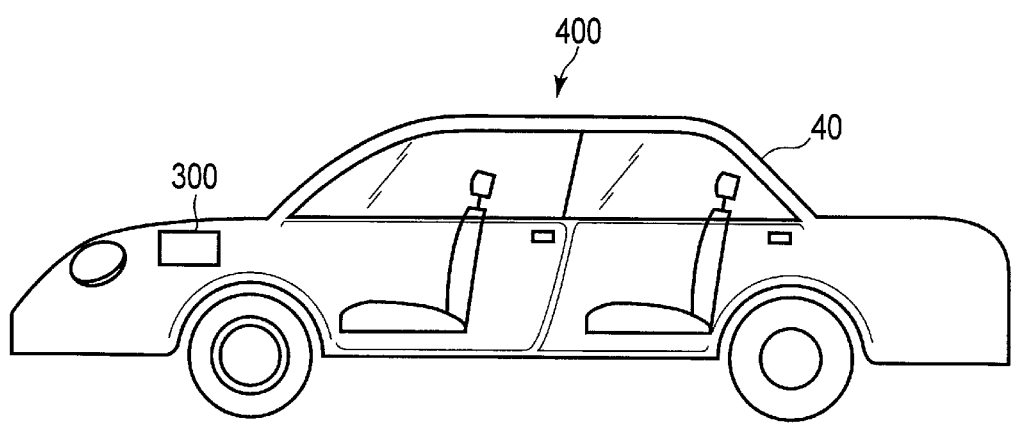
F I G. 15

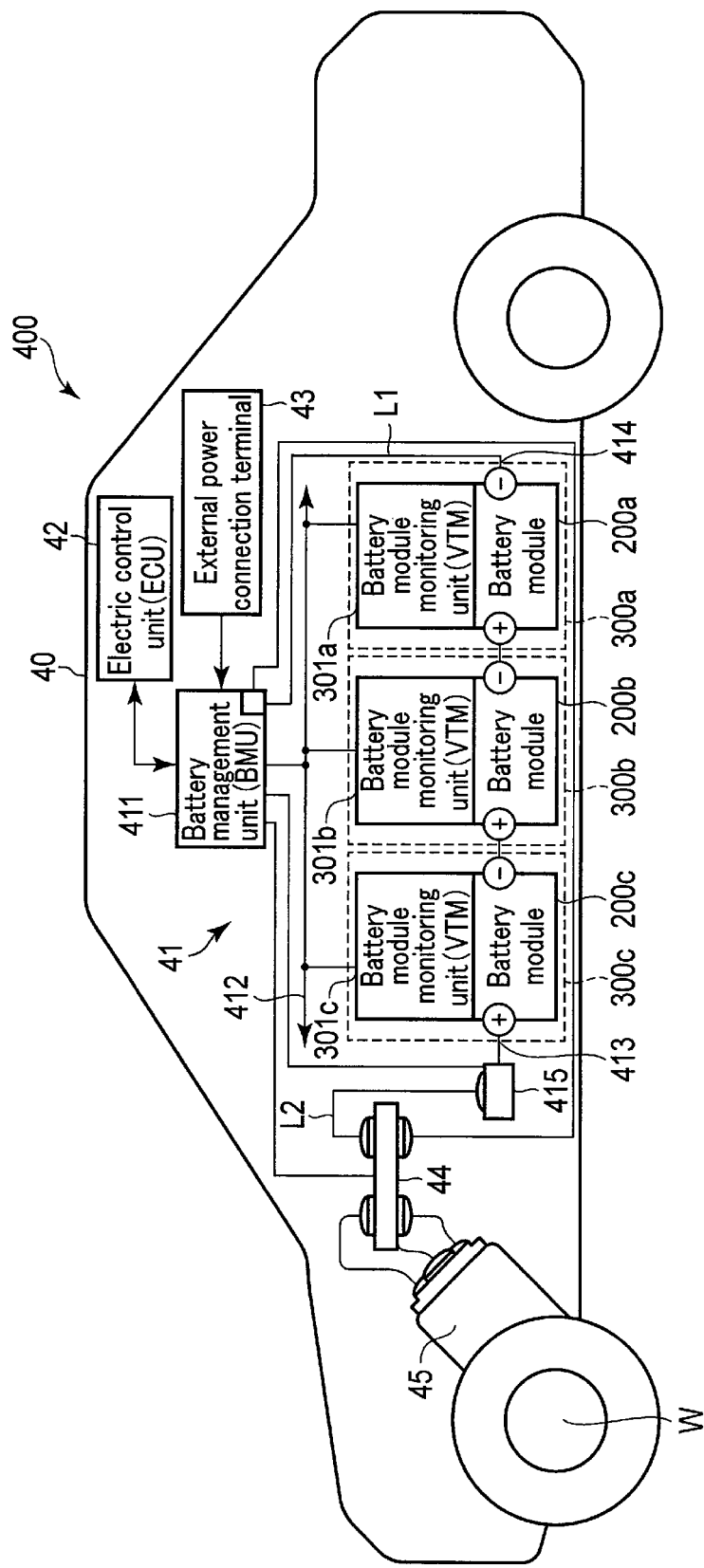
F I G. 16

SOLID ELECTROLYTE SEPARATOR, SECONDARY BATTERY, BATTERY PACK, AND VEHICLE

CROSS-REFERENCE TO RELATED APPLICATIONS

This application is based upon and claims the benefit of priority from Japanese Patent Application No. 2017-180617, filed Sep. 20, 2017, the entire contents of which are incorporated herein by reference.

FIELD

Embodiments described herein relate generally to a solid electrolyte separator, a secondary battery, a battery pack, and a vehicle.

BACKGROUND

Nonaqueous electrolyte secondary batteries containing a positive electrode and a negative electrode, which allows lithium ions to be inserted and extracted, have been widely spread in various fields including electric automobiles, power storage systems and information devices as a battery having a high energy density. Accordingly, demands on such batteries have increased, and studies thereof have gathered pace.

In order to use the nonaqueous electrolyte secondary battery for a power source for an electric automobile, it is required that an energy density is high, i.e., a discharge capacity per unit weight or unit volume is large.

On the other hand, the safety becomes an issue as the discharge capacity per unit weight or unit volume becomes larger, and a secondary battery having a more excellent safety is required. One answer to solve the problem described above is an all solid secondary battery. The all solid secondary battery is a secondary battery using a solid electrolyte, literally, instead of a nonaqueous electrolyte, i.e., an organic electrolytic solution, which has been used up till now. The organic electrolytic solution is flammable, and thus technological developments to improve the safety when the organic electrolytic solution is used are energetically performed. Nevertheless, it is difficult to secure the sufficient safety. The all solid secondary battery needs not to use the organic electrolytic solution, and thus cannot be ignited in this case. Thus, the all solid secondary battery is a secondary battery having the very high safety.

However, since lithium ion conductivity of the all solid secondary battery tends to be lowered between a positive electrode and a negative electrode, an electrolytic solution may be used according to a configuration of a battery.

BRIEF DESCRIPTION OF THE DRAWINGS

FIG. 10 is a cross-sectional view schematically showing still another example of the secondary battery according to the second embodiment;

FIG. 11 is an enlarged cross-sectional view of an A portion of the secondary battery shown in FIG. 10;

FIG. 14 is a block diagram showing an example of an electric circuit of the battery pack shown in FIG. 13;

FIG. 15 is a cross-sectional view schematically showing an example of a vehicle according to the fourth embodiment; and FIG. 16 is a view schematically showing another example of the vehicle according to the fourth embodiment.

DETAILED DESCRIPTION

Figure 1:
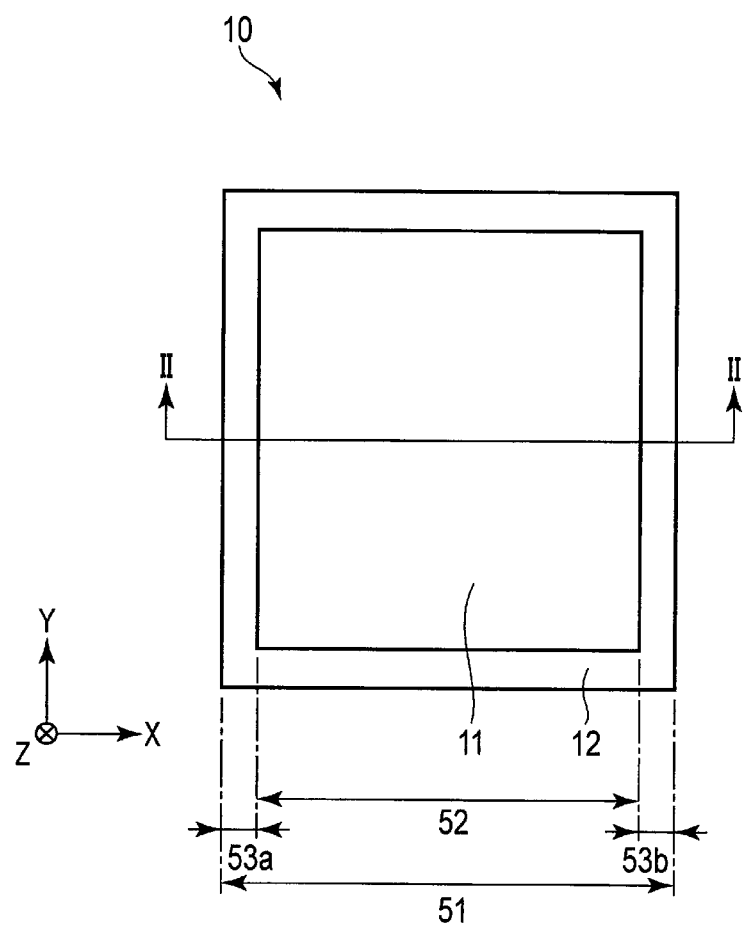
FIG. 1 is a plan view schematically showing an example of a solid electrolyte separator according to the first embodiment.

According to a first embodiment, a solid electrolyte separator is provided. The solid electrolyte separator is a sheet containing a solid electrolyte having a lithium ion conductivity. A first lithium ion conductivity in a peripheral edge region along an in-plane direction of the sheet is lower than a second lithium ion conductivity in a central region along the in-plane direction of the sheet.

According to a second embodiment, a secondary battery is provided. The secondary battery includes a first electrode which is one of a positive electrode and a negative electrode, a second electrode which is the other of the positive electrode and the negative electrode, and a solid electrolyte layer which is the solid electrolyte separator according to the first embodiment.

According to a third embodiment, a battery pack is provided. The battery pack includes a secondary battery according to the second embodiment.

According to a fourth embodiment, a vehicle is provided. The vehicle includes a battery pack according to the third embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to the first embodiment, a solid electrolyte separator is provided. The solid electrolyte separator is a sheet containing a solid electrolyte having a lithium ion conductivity. A first lithium ion conductivity in a peripheral edge region along an in-plane direction is lower than a second lithium ion conductivity in a central region along the in-plane direction.

In the prior art, in order to prevent a contact between a positive electrode and a negative electrode, for example, a stacked electrode group in which a separator is sandwiched between the positive electrode and the negative electrode has been formed. As this separator, for example, a synthetic resin nonwoven fabric containing a polymer material or the like is used. However, such a separator generally has no ionic conductivity or has very low ionic conductivity. Thus, for example, an electrolytic solution containing an organic solvent is indispensable for charge carriers such as lithium ions to come and go between the positive electrode and the negative electrode.

However, in recent years, there has been studied a structure using a separator containing solid electrolyte particles having ion conductivity, referred to as a solid electrolyte separator, instead of a separator such as a synthetic resin nonwoven fabric. Since the solid electrolyte separator is insulating and has ion conductivity, the solid electrolyte separator can serve as a medium for mediating charge carriers in addition to the function of preventing a contact between the positive electrode and the negative electrode. As a result, the electrolytic solution containing an organic solvent is not essential, and there is room for increasing a volume energy density as a secondary battery. That is, it is expected that a secondary battery with excellent safety and high energy density can be obtained by using a solid electrolyte separator.

However, there are problems caused by the use of the solid electrolyte separator. When a secondary battery is manufactured, there is sometimes a case where the size of the positive electrode and the size of the negative electrode may differ from each other. The object of this is, for example, to make reaction areas in the positive electrode and the negative electrode different from each other, or to facilitate stacking of respective members.

The present inventors found that when a positive electrode and a negative electrode having different sizes from each other are stacked and a solid electrolyte separator layer is interposed between the positive electrode and the negative electrode, a flow of ions concentrates at a corner portion of the smaller electrode, and a current concentrates, so that deterioration of an active material tends to be accelerated at the corner portion as compared to a central region of the electrode.

Thus, the present inventors succeeded in making the ion conductivity of a peripheral edge region of the solid electrolyte separator layer lower than that of a central region to prevent the flow of ions from concentrating at the corner portion of the smaller electrode, and thus to improve cycle life characteristics as a secondary battery.

Hereinafter, a solid electrolyte separator according to an embodiment will be described with reference to the drawings.

Figure 2:
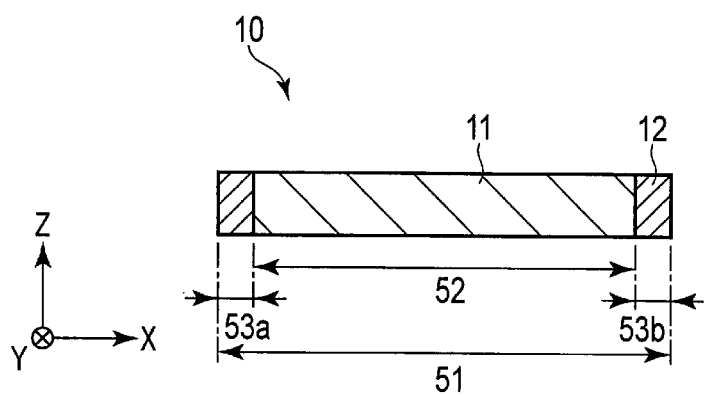
FIG. 2 is a cross-sectional view along line II-II of the solid electrolyte separator of FIG. 1.
Figure 3:
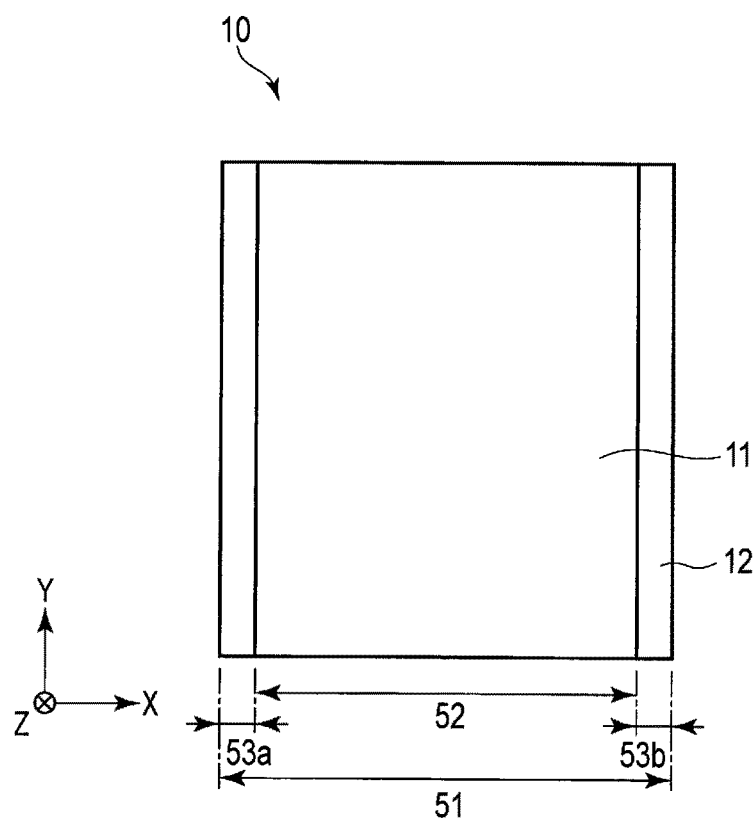
FIG. 3 is a plan view schematically showing another example of the solid electrolyte separator according to the first embodiment.

FIG. 1 is a plan view schematically showing an example of the solid electrolyte separator according to the embodiment. FIG. 2 is a cross-sectional view along line II-II of the solid electrolyte separator of FIG. 1. FIG. 3 is a plan view schematically showing another example of the solid electrolyte separator according to the embodiment.

In the following descriptions, X-direction and Y-direction are directions parallel to a principal surface of a solid electrolyte separator and orthogonal to each other. In addition, Z-direction is a direction vertical to the X-direction and the Y-direction. That is, the Z-direction is a thickness direction. The in-plane direction means that it is a direction vertical to the Z-direction.

A solid electrolyte separator 10 has a sheet shape in which areas of a major surface and a surface opposite thereto are significantly larger than areas of other surfaces. In the present specification, the major surface may be referred to as a principal surface. The solid electrolyte separator 10 has, for example, a substantially square or substantially rectangular sheet shape. FIGS. 1 to 3 show a case where the solid electrolyte separator 10 has a rectangular sheet shape extending in the X-direction and the Y-direction. This solid electrolyte separator 10 contains a solid electrolyte having lithium ion conductivity. The solid electrolyte is in the form of particles, for example.

The solid electrolyte separator 10 includes a central region 11 and a peripheral edge region 12. The central region 11 is a central region along the in-plane direction of the solid electrolyte separator 10, and the peripheral edge region 12 is a peripheral edge region along the in-plane direction of the solid electrolyte separator 10.

In FIGS. 1 and 2, the peripheral edge region 12 is provided in a frame shape in the four sides of the solid electrolyte separator 10. The peripheral edge region 12 has a certain width with respect to the X-direction or the Y-direction. As shown in FIG. 3, the peripheral edge region 12 may be provided only on two opposing sides out of the four sides of the solid electrolyte separator 10.

FIG. 1 shows a width 51 of the solid electrolyte separator 10 along one direction of the in-plane directions, a width 52 of the central region 11 in this one direction, and a width of the peripheral edge region 12 in this one direction. The width of the peripheral edge region 12 is the sum of a width 53a of one end portion in this one direction and a width 53b of the other end portion in this one direction. The sum of the width 53a of one end portion along this one direction and the width 53b of the other end portion along this one direction may referred to as a total width of the peripheral edge region 12.

A ratio of the total width of the peripheral edge region 12 to the width 51 of the solid electrolyte separator 10 is, for example, within the range of 1% to 30%. When this ratio is excessively high, the lithium ion conductivity as a solid electrolyte separator becomes too low, and the charge and discharge efficiency tends to decrease. A method of measuring the width of the solid electrolyte separator 10, the width of the central region 11, and the width of the peripheral edge region 12 will be described later.

The first lithium ion conductivity in the peripheral edge region 12 is lower than the second lithium ion conductivity in the central region 11. A method of measuring the lithium ion conductivity of the solid electrolyte separator will be described later.

The first lithium ion conductivity in the peripheral edge region 12 at 25° C. is, for example, not more than $1\times10^{-4}$ S/cm, preferably not more than $1\times10^{-10}$ S/cm. On the other hand, the second lithium ion conductivity in the central region 11 at 25° C. is, for example, not less than $1\times10^{-7}$ S/cm, preferably not less than $1\times10^{-4}$ S/cm.

A ratio of the second lithium ion conductivity in the central region 11 to the first lithium ion conductivity in the peripheral edge region 12 is, for example, within the range of 1 to $1\times10^{14}$, preferably not less than $1\times10^{6}$. When the ratio of the lithium ion conductivity between the central region and the peripheral edge region is within this range, the conduction amount of lithium ions in the peripheral edge region can be reduced as compared with the central region.

The central region 11 includes solid electrolyte particles. The central region 11 may include only one type of solid electrolyte particles to be described later or may include a mixture of two or more types thereof. The central region 11 may further include inorganic compound particles to be described later. The central region 11 may contain other components such as a binder.

The peripheral edge region 12 may or may not include solid electrolyte particles. In the case where the peripheral edge region 12 includes the solid electrolyte particles, the type of the solid electrolyte particles is not particularly limited as long as the first lithium ion conductivity in the peripheral edge region 12 is lower than that in the central region 11. It is possible to use only one type or a mixture of two or more types of the solid electrolyte particles to be described later for the solid electrolyte particles of the peripheral edge region 12. The peripheral edge region 12 may contain other components such as a binder.

In the case where the peripheral edge region 12 does not contain the solid electrolyte particles, the peripheral edge region 12 contains, for example, inorganic compound particles. The peripheral edge region 12 may include both solid electrolyte particles and inorganic compound particles.

The central region 11 includes the solid electrolyte particles in a proportion of, for example, 50% by weight to 100% by weight, preferably in a proportion of 80% by weight to 100% by weight.

The lithium ion conductivity in the central region 11 can be adjusted, for example, by appropriately changing the ratio of the weight of the solid electrolyte particles in the central region 11, the ratio of a binder, and the ratio of the other components. The lithium ion conductivity can also be adjusted by changing the type of the solid electrolyte particles included in the central region 11.

The peripheral edge region 12 includes the solid electrolyte particles in a proportion of, for example, 30% by weight to 100% by weight, preferably in a proportion of 80% by weight to 100% by weight.

The first lithium ion conductivity in the peripheral edge region 12 can be adjusted, for example, by appropriately changing the ratio of the weight of the solid electrolyte particles in the peripheral edge region 12, the ratio of a binder, and the ratio of the other components. The lithium ion conductivity can also be adjusted by changing the type of the solid electrolyte particles included in the peripheral edge region 12 or by using inorganic compound particles instead of the solid electrolyte particles as particles included in the peripheral edge region 12.

The solid electrolyte particles are, for example, particles having lithium ion conductivity at 25° C. of not less than $1 \times 10^{-10}$ S/cm. The lithium ion conductivity of the solid electrolyte particles included in the central region 11 is, for example, within the range of $1 \times 10^{-7}$ S/cm to $1 \times 10^{-2}$ S/cm. The lithium ion conductivity of the solid electrolyte particles included in the peripheral edge region 12 is, for example, within the range of $1 \times 10^{-16}$ S/cm to $1 \times 10^{-4}$ S/cm.

Examples of the solid electrolyte particles include oxides such as $LiM_2(PO_4)_3$ having a NASICON-type skeleton (M is at least one selected from Ti, Ge, Sr, Zr, Sn and Al), amorphous LIPON ($Li_{2.9}PO_{3.3}N_{0.46}$), and garnet type LLZ ($Li_7La_3Zr_2O_{12}$).

Examples of $LiM_2(PO_4)_3$ having a NASICON-type skeleton include $Li_{1+x}Al_xGe_{2-x}(PO_4)_3$, $Li_{1+x}Al_xZr_{2-x}(PO_4)_3$ and $Li_{1+x}Al_xTi_{2-x}(PO_4)_3$. In the above, x is preferably within the range of 0 to 0.5.

The lithium ion conductivity at 25° C. of an inorganic compound represented by $LiM_2(PO_4)_3$ having a NASICON-type skeleton is, for example, within the range of $1 \times 10^{-3}$ S/cm to $1 \times 10^{-5}$ S/cm.

The lithium ion conductivity at 25° C. of LIPON ($Li_{2.9}PO_{3.3}N_{0.46}$) is $3 \times 10^{-6}$ S/cm. The lithium ion conductivity at 25° C. of the garnet type LLZ ($Li_7La_3Zr_2O_{12}$) is $3 \times 10^{-4}$ S/cm.

Examples of an oxide having a garnet type structure include $Li_{5+x}A_yLa_{3-y}M_2O_{12}$ (A is at least one selected from the group consisting of Ca, Sr and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_3O_{12}$, and $Li_7La_3Zr_2O_{12}$. In the above oxides having a garnet type structure, a range of x is, for example, $0 \le x < 0.8$, preferably $0 \le x \le 0.5$. A range of y is, for example, $0 \le y < 2$. The oxide having a garnet type structure may include one of these compounds or contain a mixture of two or more of these compounds. Among them, since $Li_{6.25}Al_{0.25}La_3Zr_3O_{12}$ and $Li_7La_3Zr_2O_{12}$ have high ion conductivity and are electrochemically stable, they have excellent discharge performance and cycle life performance.

The solid electrolyte particles may include polymer type solid electrolyte particles. The solid electrolyte particles may be polymer type solid electrolyte particles. The polymer type solid electrolyte particles contain an organic compound having lithium ion conductivity and a lithium salt. As the lithium salt, one kind of lithium salt may be selected and used from lithium salts that can be used for an electrolyte salt that can be contained in an electrolyte to be described later, or a mixture of two or more kinds of the lithium salts may be used. The polymer type solid electrolyte particles may further contain a solvent such as an organic solvent.

Examples of a polymer material include polyether type, polyester type, polyamine type, polyethylene type, silicone type and polysulfide type.

The average particle diameter of the solid electrolyte particles is, for example, from 0.05 μm to 10 μm.

The average particle diameter of the solid electrolyte particles can be measured with a scanning electron microscope (SEM).

Examples of inorganic compound particles include at least one selected from the group consisting of alumina, titanium oxide, titanium hydroxide, barium titanate, iron oxide, silicon oxide, aluminum hydroxide, gibbsite, boehmite, bayerite, magnesium oxide, silica, zirconium oxide, magnesium hydroxide, lithium tetraborate, lithium tantalate, mica, silicon nitride, aluminum nitride, and zeolite.

Examples of a binder include at least one selected from the group consisting of cellulose acetate, polytetrafluoro ethylene (PTFE), polyvinylidene fluoride (PVdF), fluororubber, styrene-butadiene rubber, polyacrylic acid compounds, and imide compounds.

<Measurement of Width of Solid Electrolyte Separator>

When the solid electrolyte separator has a square or rectangular sheet shape, the four sides of the square or rectangle include two pairs of two opposing sides. The width of the solid electrolyte separator is measured along a straight line orthogonal to any one pair of two sides among the two pairs of two opposing sides. This straight line is a straight line extending along the in-plane direction of the solid electrolyte separator and passing through a boundary between the central region and the peripheral edge region. In the case of the solid electrolyte separator shown in FIG. 2, for example, two boundaries between the central region and the peripheral edge region are provided, and therefore, the above-described straight line is assumed to be a straight line passing through both the boundaries.

The boundary between the central region and the peripheral edge region included in the solid electrolyte separator can be determined by time of flight secondary ion mass spectrometry (TOF-SIMS). According to this method, since it is possible to analyze an element composition of a surface of the solid electrolyte separator, it is possible to determine a boundary between a region with high lithium ion conductivity and a region with low lithium ion conductivity.

The solid electrolyte separator is cut along the straight line parallel to the Z-direction (thickness direction). Then, the maximum and minimum widths of the solid electrolyte separator at the cut surface are measured. At this time, the width is measured along a direction orthogonal to the Z-direction. An average value of the measured maximum and minimum widths is regarded as the width of the solid electrolyte separator.

The width of the peripheral edge region is a distance from a contour of the solid electrolyte separator to the boundary between the central region and the peripheral edge region previously determined on the cut surface. The width of the central region is a distance from one boundary of the boundaries between the central region and the peripheral edge region to the other boundary between the central region and the peripheral edge region on the cut surface. When there are plural of peripheral edge regions on the cut surface, a total (total width) of the widths of the peripheral edge regions is regarded as the width of the peripheral edge region.

Even when the solid electrolyte separator does not have a square or rectangular sheet shape, there is no difference in measuring the width of the solid electrolyte separator along a straight line passing through the central region and the peripheral edge region. However, when the solid electrolyte separator is cut parallel to the Z-direction (thickness direction), the solid electrolyte separator is cut at a position where the width of the solid electrolyte separator becomes maximum.

Then, the maximum and minimum widths of the solid electrolyte separator at the cut surface are measured. At this time, the width is measured along a direction orthogonal to the Z-direction. An average value of the measured maximum and minimum widths is regarded as the width of the solid electrolyte separator.

<Measurement of Lithium Ion Conductivity>

A battery is disassembled in an argon atmosphere glove box, and a laminate as an electrode having a solid electrolyte layer including the central region and the peripheral edge region is taken out. The laminate is washed and vacuum-dried at room temperature.

Then, a portion of the peripheral edge region of the solid electrolyte layer is scraped off and formed into a green compact using a tablet former. A gold (Au) electrode is vapor-deposited on both sides of the green compact to obtain a measurement sample. Even when the peripheral edge region includes a plurality of types of solid electrolyte particles and inorganic compound particles, measurement is performed in a state where these particles are mixed.

Thereafter, for this measurement sample, measurement is carried out using a frequency response analyzer 1260 model manufactured by Solartron Metrology. A measurement frequency range is within the range of 5 Hz to 32 MHz. Measurement is carried out under an environment at 25° C. in a state where the measurement sample is placed under a dry argon atmosphere without being exposed to the atmosphere. From the measurement result, an AC impedance component $Z_{Li}$ [ohm] of Li ion conduction is obtained. From the $Z_{Li}$, an area S [cm$^2$] of the measurement sample, and a thickness d [cm] of the measurement sample, an ionic conductivity $\sigma_{Li}$ [S/cm] of the peripheral edge region can be calculated by the following formula:

$$\sigma_{Li}=(1/Z_{Li})\times(d/S).$$

On the other hand, a portion of the central region of the solid electrolyte layer is scraped off and formed into a green compact using a tablet former. A gold (Au) electrode is vapor-deposited on both sides of the green compact to obtain a measurement sample.

The ion conductivity in the central region can be calculated by applying the same operation as described for the peripheral edge region to this sample.

The solid electrolyte separator according to the first embodiment is a sheet containing a solid electrolyte having a lithium ion conductivity, and a first lithium ion conductivity in the peripheral edge region along the in-plane direction of the sheet is lower than a second lithium ion conductivity in the central region along the in-plane direction of the sheet. Thus, the solid electrolyte separator can reduce the conduction amount of lithium ions to a corner portion of the positive electrode or the negative electrode in contact with the solid electrolyte separator. As a result, a secondary battery having excellent cycle life characteristics can be realized.

Second Embodiment

According to the second embodiment, a secondary battery is provided. The secondary battery includes a first electrode which is one of a positive electrode and a negative electrode, a second electrode which is the other of the positive electrode and the negative electrode, and a solid electrolyte layer which is the solid electrolyte separator according to the first embodiment. The secondary battery includes, for example, the first electrode which is the negative electrode, the second electrode which is the positive electrode, and the solid electrolyte layer including the solid electrolyte separator according to the first embodiment.

The secondary battery may include one solid electrolyte layer or plural of solid electrolyte layers. For example, one solid electrolyte layer is interposed between the positive electrode and the negative electrode.

The secondary battery according to the embodiment will be described with reference to the drawings.

Figure 4:
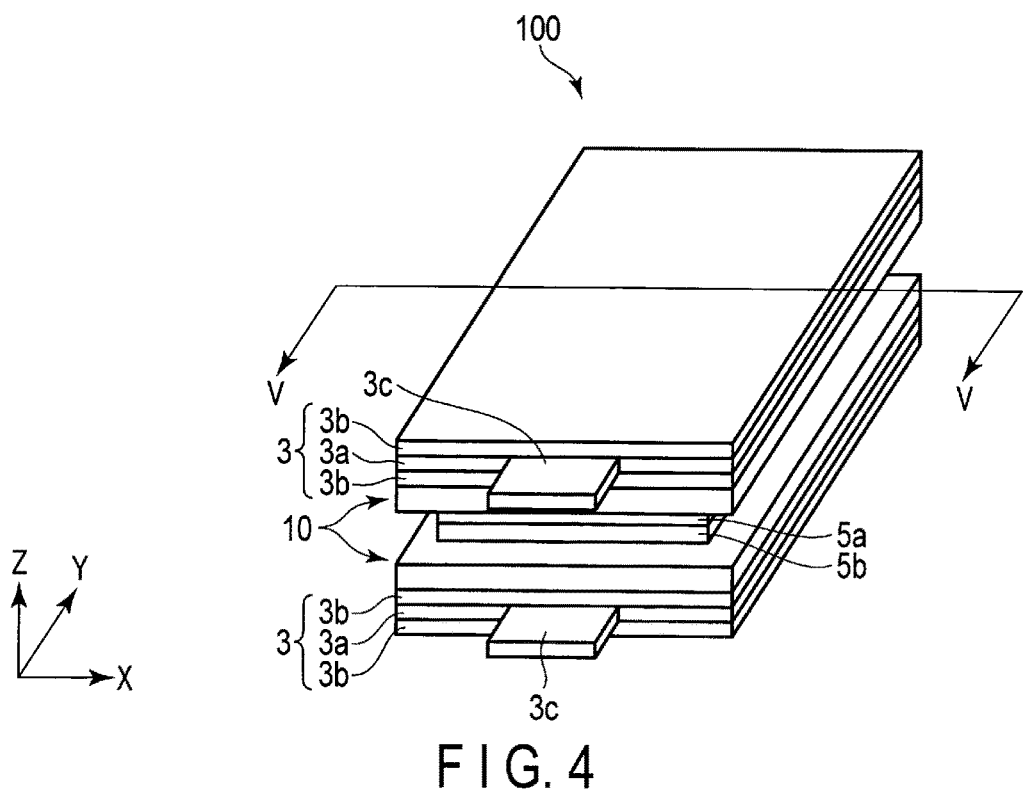
FIG. 4 is a perspective view schematically showing an example of a secondary battery according to the second embodiment.
Figure 5:
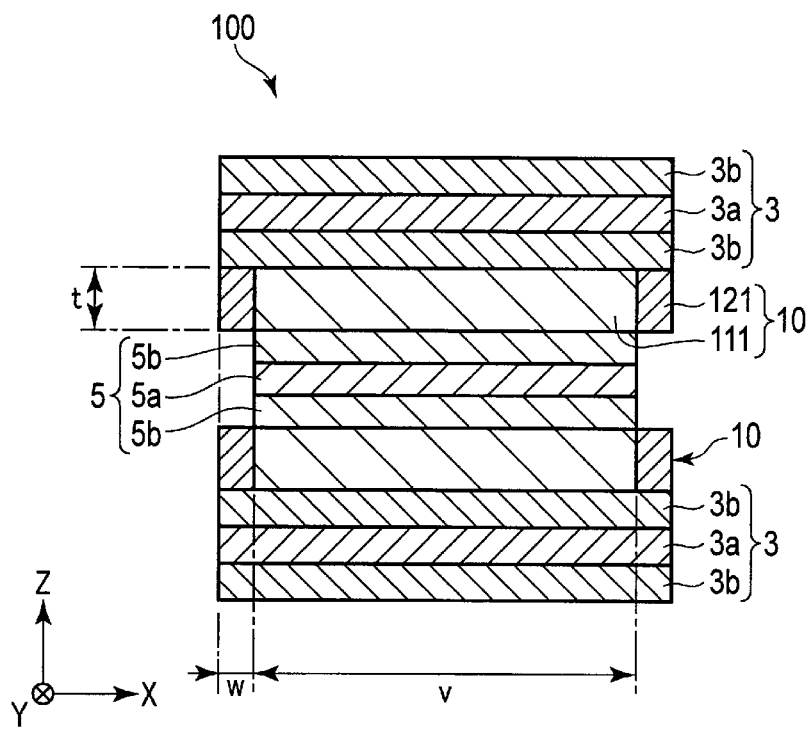
FIG. 5 is a cross-sectional view along line V-V of the secondary battery of FIG. 4.

FIG. 4 is a perspective view schematically showing an example of the secondary battery according to the embodiment. FIG. 5 is a cross-sectional view along line V-V of the secondary battery of FIG. 4.

A secondary battery 100 shown in FIGS. 4 and 5 includes a negative electrode 3, a positive electrode 5, and a solid electrolyte layer 10 consisting of the solid electrolyte separator according to the first embodiment. The negative electrode 3 includes, for example, a rectangular negative electrode current collector 3a formed of a metal foil and a negative electrode active material-containing layer 3b formed on both surfaces of the negative electrode current collector 3a. The negative electrode 3 further includes a negative electrode tab 3c (negative electrode tab portion) formed of an end parallel to the short side of the negative electrode current collector 3a. The positive electrode 5 includes, for example, a rectangular positive electrode current collector 5a formed of a metal foil and a positive electrode active material-containing layer 5b formed on both surfaces of the positive electrode current collector 5a.

Although not shown in the drawing, a positive electrode tab 5c (positive electrode tab portion) formed of an end portion parallel to the short side of the positive electrode current collector 5a protrudes from the positive electrode current collector 5a on a surface facing a surface from which the negative electrode tab portion 3c of the secondary battery protrudes. That is, the positive electrode 5 further includes the positive electrode tab portion 5c.

FIGS. 4 and 5 show, as an example, a case where the dimension of the negative electrode 3 in the X-direction is larger than the dimension of the positive electrode 5 in the x-direction, and the dimension of the negative electrode 3 in the Y-direction is also larger than the dimension of the positive electrode 5 in the Y-direction. More specifically, the dimensions of the negative electrode current collector 3a and the negative electrode active material-containing layer 3b in the X-direction are larger than the dimensions of the positive electrode current collector 5a and the positive electrode active material-containing layer 5b in the X-direction. In addition, the dimensions of the negative electrode current collector 3a and the negative electrode active material-containing layer 3b in the Y-direction are larger than the dimensions of the positive electrode current collector 5a and the positive electrode active material-containing layer 5b in the Y-direction. The dimensions of the negative electrode tab portion 3c and the positive electrode tab portion 5c are not particularly limited.

The solid electrolyte layer 10 as a solid electrolyte separator is interposed between the negative electrode 3 and the positive electrode 5.

The secondary battery 100 shown in FIGS. 4 and 5 is configured by stacking the negative electrode 3, the solid electrolyte layer 10, the positive electrode 5, the solid electrolyte layer 10, and the negative electrode 3 in this order. The solid electrolyte layer 10, the positive electrode 5, the solid electrolyte layer 10, and the negative electrode 3 may be further stacked in this order on the negative electrode 3 (the negative electrode active material-containing layer 3b) not in contact with the solid electrolyte layer 10, and these may be stacked in this order plural times.

The solid electrolyte layer 10 has a first surface and a second surface facing the first surface. At least a portion of the first surface is in contact with the negative electrode 3, and at least a portion of the second surface is in contact with the positive electrode 5. FIGS. 4 and 5 show, as an example, a case where the entire first surface is in contact with the negative electrode 3, and a portion of the second surface is in contact with the positive electrode 5. Only a portion of the first surface may be in contact with the negative electrode 3. The area of the first surface which is a major surface and the area of the second surface opposite to the first surface are both significantly larger than the areas of the other surfaces of the solid electrolyte layer 10.

In the secondary battery 100 shown in FIGS. 4 and 5, a width of the negative electrode 3 along each in-plane direction is larger than a width of the positive electrode 5 along each in-plane direction. In other words, the width of the negative electrode 3 along a certain in-plane direction is larger than the width of the positive electrode 5 along the relevant in-plane direction.

The solid electrolyte layer 10 has the same structure as the solid electrolyte separator described with reference to FIGS. 1 and 2.

That is, the solid electrolyte layer 10 includes a central region 11 and a peripheral edge region 12. The central region 11 is a central region along the in-plane direction of the solid electrolyte layer 10, and the peripheral edge region 12 is a peripheral edge region along the in-plane direction of the solid electrolyte layer 10.

The peripheral edge region 12 is a frame-shaped region corresponding to four sides extending in the X-direction and the Y-direction of the solid electrolyte layer 10. The peripheral edge region 12 included in the solid electrolyte layer 10 is a region corresponding to a difference between the width of the negative electrode 3 and the width of the positive electrode 5.

The peripheral edge region 12 has a certain width with respect to the X-direction or the Y-direction. As shown in FIG. 5, the width of the peripheral edge region 12 in the X-direction is a width corresponding to a difference in dimension between the width of the negative electrode 3 and the width of the positive electrode 5. Although not shown, the width of the peripheral edge region 12 in the Y-direction is a width corresponding to a difference in dimension in the Y-direction between the negative electrode 3 and the positive electrode 5.

The width of the central region 11 in the X-direction is a width corresponding to the width of the positive electrode 5 in the X-direction. Although not shown, the width of the central region 11 in the Y-direction is a width corresponding to the width of the positive electrode 5 in the Y-direction.

That is, the peripheral edge region 12 is a region corresponding to a difference between the width of the negative electrode 3 and the width of the positive electrode 5 along each direction of the in-plane directions of the solid electrolyte layer 10. The central region 11 is a region corresponding to the width of the positive electrode 5 along each direction of the in-plane directions of the solid electrolyte layer 10.

The facing area between the negative electrode 3 and the positive electrode 5 is preferably larger than the area of the peripheral edge region 12. FIGS. 4 and 5 illustrate the case where the facing area between the negative electrode 3 and the positive electrode 5 is larger than the area of the peripheral edge region 12.

In FIG. 5, the width of the peripheral edge region 12 in the X-direction is indicated by w, and the thickness of the peripheral edge region in the Z-direction is indicated by t. Further, the width of the central region 11 in the X-direction is indicated by v. The thickness of the central region 11 in the Z-direction is indicated by t similarly to the peripheral edge region 12.

The peripheral edge region 12 includes a first portion 121. The first portion 121 includes a surface in contact with the negative electrode 3 and being located in the first surface. In the secondary battery 100 shown in FIGS. 4 and 5, the whole of the four sides of the peripheral edge region 12 consists of the first portion 121. Thus, in each of the four sides constituting the peripheral edge region 12, the first portion 121 is in contact with the negative electrode 3.

The central region 11 includes a second portion 111. The second portion 111 includes a surface in contact with the negative electrode 3 and being located in the first surface. The second portion 111 also includes a surface in contact with the positive electrode 5 and being located in the second surface. In the secondary battery 100 shown in FIGS. 4 and 5, the entire central region 11 consists of the second portion 111. Thus, the second portion 111 is in contact with both the negative electrode 3 and the positive electrode 5.

In the secondary battery 100 shown in FIGS. 4 and 5, one surface of the first portion 121 constituting the peripheral edge region 12 is in contact with the negative electrode active material-containing layer 3b, and the other surface of the first portion 121 constituting the peripheral edge region 12 is not in contact with the positive electrode active material-containing layer 5b. One surface of the second portion 111 constituting the central region 11 is in contact with the negative electrode active material-containing layer 3b, and the other surface of the second portion 111 constituting the central region 11 is in contact with the positive electrode active material-containing layer 5b.

The lithium ion conductivity of the first portion 121 is lower than the lithium ion conductivity of the second portion 111. For example, by increasing the ratio of a binder to the weight of the first portion 121 as compared to the ratio of the binder to the weight of the second portion 111, the lithium ion conductivity of the first portion 121 can be made lower than the lithium ion conductivity of the second portion 111.

Accordingly, the first lithium ion conductivity in the peripheral edge region 12 is lower than the second lithium ion conductivity in the central region 11. As a result, when the secondary battery 100 is charged and discharged, a flow of lithium ions does not concentrate at a corner portion of the positive electrode active material-containing layer 5b, so that the secondary battery 100 has excellent cycle life characteristics.

As shown in FIG. 5, the width of the positive electrode 5 in the X-direction is preferably larger than a total width of the first portion 121 in the X-direction. Here, the total width of the first portion 121 means a total of the width of one of the first portions 121 and the width of the other first portion 121 in the solid electrolyte layer 10. More preferably, the width of the positive electrode 5 along each in-plane direction of the solid electrolyte layer 10 is larger than a total width of the first portion 121 in the relevant each direction.

The facing area between the negative electrode 3 and the positive electrode 5 is preferably larger than a total area of the first portion 121. FIGS. 4 and 5 illustrate the case where the facing area between the negative electrode 3 and the positive electrode 5 is larger than the total area of the first portion 121.

Figure 6:
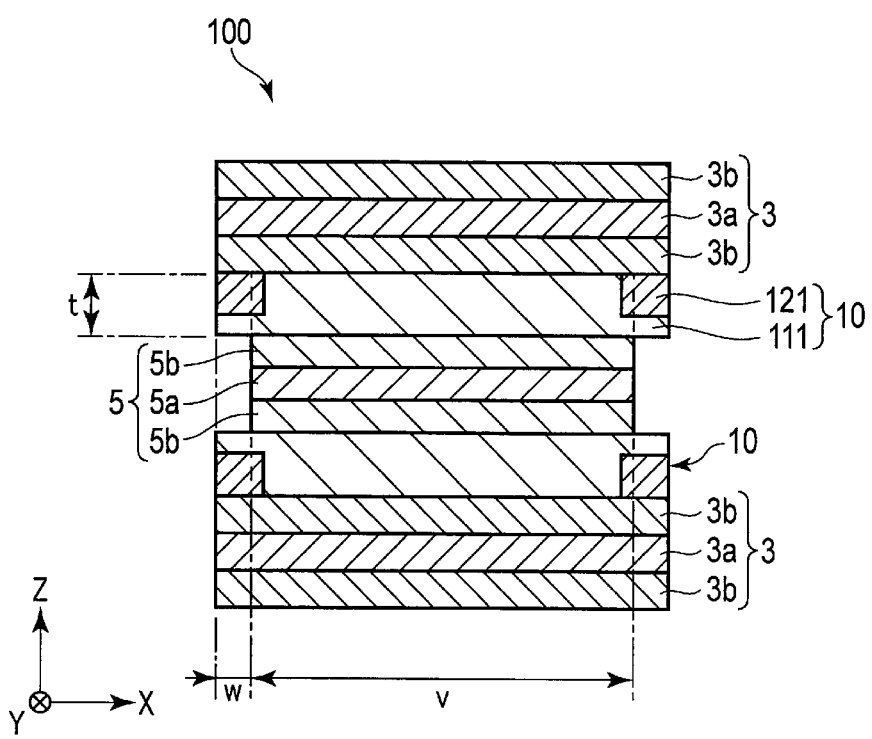
FIG. 6 is a cross-sectional view schematically showing another example of the secondary battery according to the second embodiment.
Figure 7:
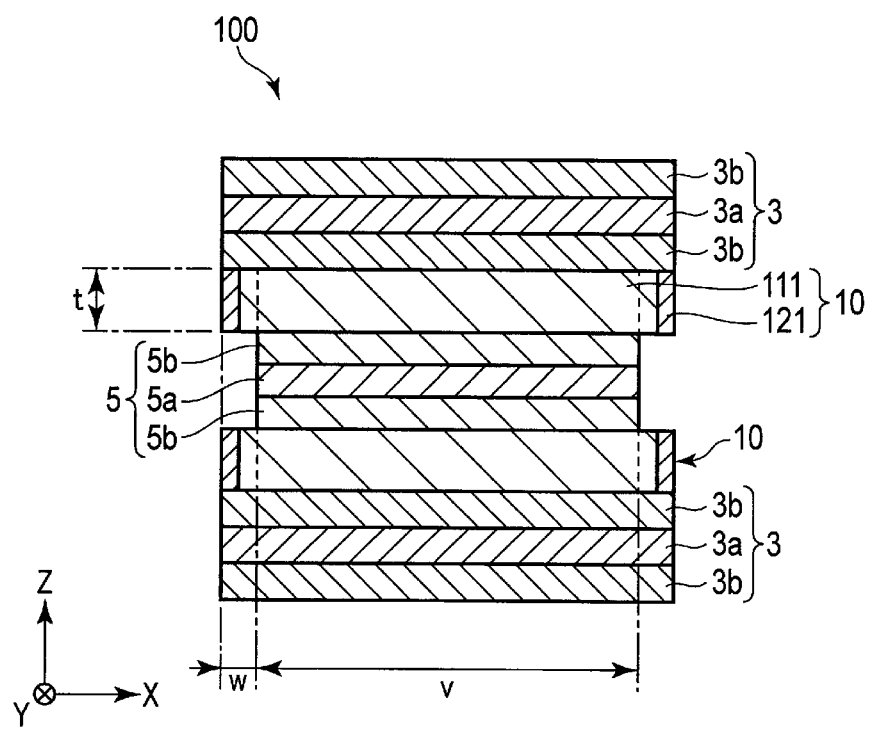
FIG. 7 is a cross-sectional view schematically showing still another example of the secondary battery according to the second embodiment.

FIG. 6 is a cross-sectional view schematically showing another example of the secondary battery according to the embodiment. FIG. 7 is a cross-sectional view schematically showing still another example of the secondary battery according to the embodiment. The secondary battery 100 shown in FIGS. 6 and 7 has the same configuration as the secondary battery described with reference to FIGS. 4 and 5 except for the configuration of the solid electrolyte layer 10.

In the secondary battery 100 of FIG. 6, the first portion 121 having low lithium ion conductivity is included in both the peripheral edge region 12 and the central region 11. On the other hand, the second portion 111 having higher lithium ion conductivity than the first portion 121 is included in both the peripheral edge region 12 and the central region 11.

That is, the peripheral edge region 12 included in the solid electrolyte layer 10 includes the first portion 121 and the second portion 111. The peripheral edge region 12 includes the first portion 121 including a surface in contact with the negative electrode 3 in the first surface of the solid electrolyte layer 10. The second portion 111 included in the peripheral edge region 12 is not in contact with both the negative electrode 3 and the positive electrode 5.

The central region 11 also includes the first portion 121 and the second portion 111. The second portion 111 included in the central region 11 is in contact with both the negative electrode 3 and the positive electrode 5. In other words, the central region 11 includes the second portion 111 including the surface in contact with the negative electrode 3 in the first surface of the solid electrolyte layer 10 and the surface in contact with the positive electrode 5 in the second surface. The first portion 121 included in the central region 11 includes a surface in contact with the negative electrode 3 in the first surface of the solid electrolyte layer 10.

As shown in FIG. 6, the peripheral edge region 12 of the solid electrolyte layer 10 may not include the first portion 121 provided over the entire length in the thickness direction (Z-direction) of the solid electrolyte layer 10.

When the secondary battery 100 of FIG. 6 is charged and discharged, a flow of lithium ions does not concentrate at the corner portion of the positive electrode active material-containing layer 5b, so that the secondary battery 100 has excellent cycle life characteristics.

As described above, the configuration of the solid electrolyte layer 10 is not particularly limited as long as the peripheral edge region 12 includes the first portion 121 including the surface in contact with the negative electrode 3 in the first surface of the solid electrolyte layer 10. For example, the solid electrolyte layer 10 may have the configuration shown in FIG. 7.

As shown in FIG. 7, the peripheral edge region 12 of the solid electrolyte layer 10 includes the first portion 121 and the second portion 111. The peripheral edge region 12 includes the first portion 121 including the surface in contact with the negative electrode 3 in the first surface of the solid electrolyte layer 10. The peripheral edge region 12 further includes the second portion 111 including the surface in contact with the negative electrode 3 in the first surface of the solid electrolyte layer 10.

The central region 11 consists of the second portion 111. The second portion 111 included in the central region 11 is in contact with both the negative electrode 3 and the positive electrode 5. In other words, the central region 11 includes the second portion 111 including the surface in contact with the negative electrode 3 in the first surface of the solid electrolyte layer 10 and the surface in contact with the positive electrode 5 in the second surface.

Figure 8:
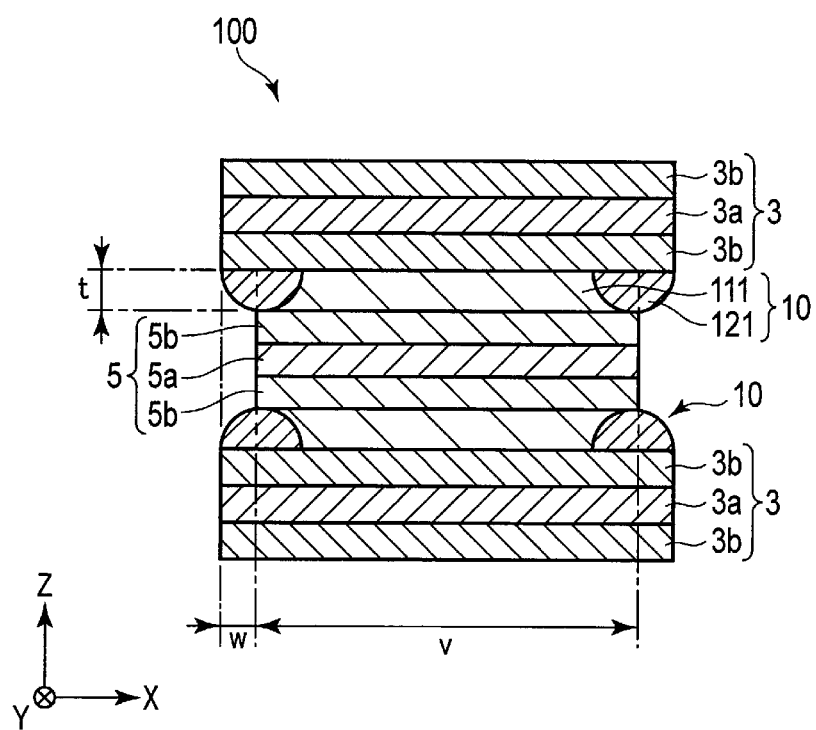
FIG. 8 is a cross-sectional view schematically showing still another example of the secondary battery according to the second embodiment.

FIG. 8 is a cross-sectional view schematically showing still another example of the secondary battery according to the embodiment. The secondary battery 100 shown in FIG. 8 has the same configuration as the secondary battery described with reference to FIGS. 4 and 5 except for the configuration of the solid electrolyte layer 10.

In the secondary battery 100 shown in FIG. 8, the peripheral edge region 12 included in the solid electrolyte layer 10 consists of the first portion 121 including the surface in contact with the negative electrode 3 in the first surface.

The central region 11 included in the solid electrolyte layer 10 includes the first portion 121 and the second portion 111. The central region 11 includes the second portion 111 including the surface in contact with the negative electrode 3 in the first surface and the surface in contact with the positive electrode 5 in the second surface. The central region 11 further includes the first portion 121 including the surface in contact with the negative electrode 3 in the first surface and the surface in contact with the positive electrode 5 in the second surface.

As shown in FIG. 8, in the central region 11, in addition to the fact that the second portion 111 is in contact with both the negative electrode 3 and the positive electrode 5, the first portion 121 may be in contact with both the negative electrode 3 and the positive electrode 5.

The shape of the peripheral edge region 12 is not particularly limited. For example, as in the secondary battery 100 shown in FIG. 8, the shape of the cross section along the X-direction of the peripheral edge region 12 may be a half moon shape.

In the above description, the peripheral edge region 12 consists of four sides and has a frame shape, and the solid electrolyte layer 10 includes the first portion 121 including the surface in contact with the negative electrode 3 in each of these four sides. However, among the four sides of the frame shape of the peripheral edge region 12, only the two opposing sides may be included in the first portion 121. For example, among the four sides constituting the peripheral edge region 12, the first portion 121 may be provided at the side along a side surface from which the negative electrode tab 3c protrudes and the side along a side surface from which the positive electrode tab 5c (not shown) protrudes. Alternatively, among the four sides constituting the peripheral edge region 12, the first portion 121 may be provided only at the two sides along two opposed side surfaces from which the negative electrode tab 3c and the positive electrode tab 5c do not protrude.

In the case where the solid electrolyte layer 10 is substantially square or substantially rectangular, a ratio of the width of the first portion 121 along one of the in-plane directions to the width of the solid electrolyte layer 10 in the relevant one direction is, for example, within the range of 1% to 50%, preferably within the range of 1% to 30%. If the ratio is excessively low, the conduction amount of lithium ions to the corner portion of the positive electrode active material-containing layer 5b cannot be sufficiently reduced, so that there is a possibility that the cycle life characteristics are not improved.

In the case where the solid electrolyte layer 10 is substantially square or substantially rectangular, in the central region 11 of the solid electrolyte layer 10, a ratio of the width of the first portion 121 along one of the in-plane directions to the width of the positive electrode 5 in the relevant one direction is, for example, within the range of 0% to 20%, preferably within the range of 0% to 5%. If the ratio is excessively high, the width of the second portion 111 in contact with both the negative electrode 3 and the positive electrode 5 becomes too small, and the rate characteristics tend to be inferior.

The ratio of the thickness of the first portion 121 to the thickness of the peripheral edge region 12 included in the solid electrolyte layer 10 is, for example, within the range of 50% to 100%.

<Measurement of Width>

The width of the solid electrolyte layer, the width of the positive electrode, and the width of the negative electrode included in the secondary battery can be measured as follows. Here, as an example, a case where the width of the negative electrode along each in-plane direction is larger than the width of the positive electrode along each in-plane direction will be described.

First, the battery is disassembled in an argon atmosphere glove box, and a laminate as an electrode having the solid electrolyte layer including the central region and the peripheral edge region is taken out. The laminate is washed and vacuum-dried at room temperature.

Then, time of flight secondary ion mass spectrometry (TOF-SIMS) is applied to a surface of the solid electrolyte layer. Consequently, it is possible to determine a boundary between a region with high lithium ion conductivity and a region with low lithium ion conductivity, that is, a boundary between the second portion and the first portion.

Then, a straight line passing through the first portion having a relatively low lithium ion conductivity and the second portion having a higher lithium ion conductivity than the first portion and extending along one of the in-plane directions of the solid electrolyte layer is determined. Along this straight line, the target laminate is cut parallel to the thickness direction (Z-direction). When the laminate is observed along the Z-direction, in a case where the solid electrolyte layer has a square or rectangular shape, this straight line is a straight line orthogonal to two opposing sides among four sides constituting this square or rectangle. When the laminate is observed along the Z-direction, in a case where the solid electrolyte layer does not have a square or rectangular shape, when the laminate is cut parallel to the thickness direction, the laminate is cut at a position where the width of the solid electrolyte layer becomes maximum.

In the solid electrolyte layer, a region corresponding to a difference between the width of the negative electrode and the width of the positive electrode at this cut surface can be determined as the peripheral edge region. On the other hand, in the solid electrolyte layer, a region corresponding to the width of the positive electrode at the cut surface can be determined as the central region.

Then, the maximum and minimum widths of each member at the cut surface are measured. At this time, the width is measured along a direction orthogonal to the Z-direction. An average value of the measured maximum and minimum widths is regarded as the width of each member.

In the cut surface, the maximum and minimum widths of the first portion included in the solid electrolyte layer are measured, and an average value thereof is regarded as the width of the first portion. Further, in the cut surface, the maximum and minimum widths of the second portion included in the solid electrolyte layer are measured, and an average value thereof is regarded as the width of the second portion.

Although FIGS. 4 to 8 illustrate a case where an outer periphery of the first portion 121 coincides with a contour of the negative electrode 3, the outer periphery of the first portion 121 may exist more inside than the contour of the negative electrode 3. For example, in the peripheral edge region 12 included in the solid electrolyte layer 10, the second portion 111 may exist outside the first portion 121. Alternatively, as a result of the fact that a contour of the solid electrolyte layer 10 exists more inside than the contour of the negative electrode 3, the outer periphery of the first portion 121 may exist more inside than the contour of the negative electrode 3.

Figure 9:
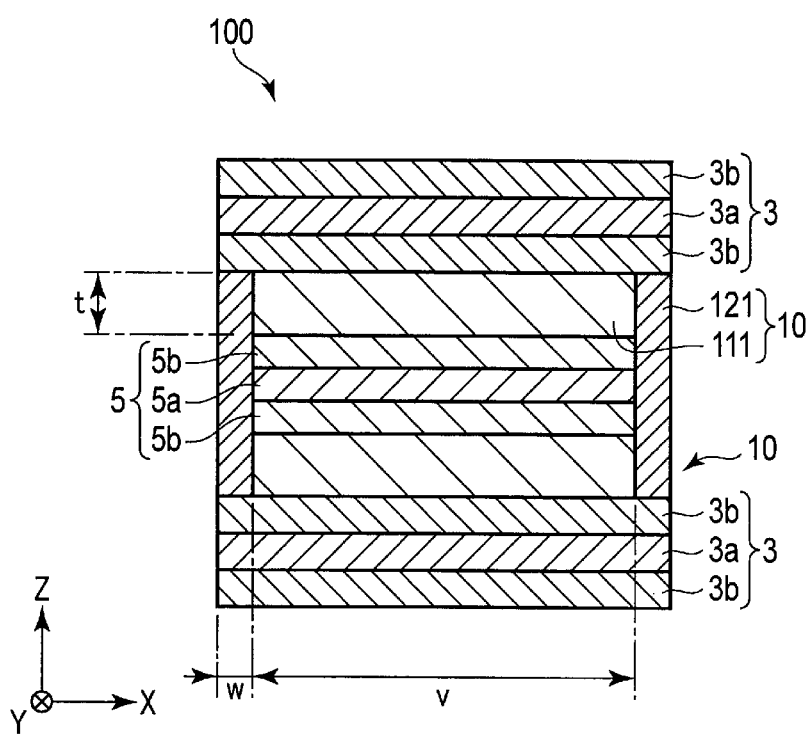
FIG. 9 is a cross-sectional view schematically showing still another example of the secondary battery according to the second embodiment.

FIG. 9 is a cross-sectional view schematically showing still another example of the secondary battery according to the embodiment. The secondary battery 100 shown in FIG. 9 has the same configuration as the secondary battery described with reference to FIGS. 4 and 5 except that the two solid electrolyte layers 10 facing each other with the positive electrode 5 interposed therebetween are connected by the respective peripheral edge regions 12. As shown in FIG. 9, the peripheral edge region 12 may or may not be in contact with the positive electrode current collector 5a and the positive electrode active material-containing layer 5b.

As shown in FIG. 9, the thickness of the peripheral edge region 12 in the Z-direction may be larger than the thickness of the central region 11. However, the two solid electrolyte layers 10 facing each other with the positive electrode 5 interposed therebetween may not be connected to each other by the peripheral edge regions 12 included in the solid electrolyte layers 10.

In FIGS. 4 to 9, the case where the dimensions in the X-direction and the Y-direction of the positive electrode 5 is smaller than the dimensions in the X-direction and the Y-direction of the negative electrode 3 has been described; however, this relationship may be reversed. That is, the dimensions in the X-direction and the Y-direction of the positive electrode 5 may be larger than the dimensions in the X-direction and the Y-direction of the negative electrode 3.

In the secondary batteries according to FIGS. 4 to 9, the two solid electrolyte layers facing each other with the positive electrode interposed therebetween are vertically symmetrical with respect to the positive electrode as a symmetry plane. However, the two solid electrolyte layers facing each other with the positive electrode interposed therebetween may have different configurations.

The secondary battery according to the embodiment may have a spiral structure shown in FIGS. 10 and 11. The secondary battery shown in FIGS. 10 and 11 is a nonaqueous electrolyte secondary battery including a nonaqueous electrolyte to be described later.

FIG. 10 is a cross-sectional view schematically showing still another example of the secondary battery according to the embodiment. FIG. 11 is an enlarged cross-sectional view of an A portion of the secondary battery shown in FIG. 10.

The secondary battery 100 shown in FIGS. 10 and 11 includes a bag-like container member 2 shown in FIG. 10, an electrode group 1 shown in FIGS. 10 and 11, and an electrolyte (not shown). The electrode group 1 and the electrolyte are contained in the bag-like container member 2. Although not shown, the electrolyte is held by the electrode group 1.

The bag-like container member 2 is formed of a laminate film including two resin layers and a metal layer interposed therebetween.

As shown in FIG. 10, the electrode group 1 is a flat wound electrode group. As shown in FIG. 10, the flat wound electrode group 1 includes the negative electrode 3, the solid electrolyte layer 10, and the positive electrode 5. The solid electrolyte layer 10 is interposed between the negative electrode 3 and the positive electrode 5.

The negative electrode 3 includes a negative electrode current collector 3a and a negative electrode active material-containing layer 3b. In a portion of the negative electrode 3 located at the outermost shell of the wound electrode group 1, as shown in FIG. 11, the negative electrode active material-containing layer 3b is formed only on an inner surface side of the negative electrode current collector 3a. In the other portion of the negative electrode 3, the negative electrode active material-containing layers 3b are formed on both surfaces of the negative electrode current collector 3a.

The positive electrode 5 includes a positive electrode current collector 5a and a positive electrode active material-containing layer 5b formed on both sides thereof.

Although not shown, in the electrode group 1, the width of the negative electrode 3 in a direction orthogonal to a winding axis is larger than the width of the positive electrode 5 in this direction. The peripheral edge region of the solid electrolyte layer 10 corresponding to a difference between the width of the negative electrode 3 and the width of the positive electrode 5 in this direction includes a first portion in contact with the negative electrode 3. On the other hand, in the electrode group 1, the central region of the solid electrolyte layer 10 corresponding to the width of the positive electrode 5 in the direction orthogonal to the winding axis includes a second portion in contact with the negative electrode 3 and the positive electrode 5. The lithium ion conductivity of the first portion is lower than the lithium ion conductivity of the second portion.

As shown in FIG. 10, the negative electrode terminal 6 and the positive electrode terminal 7 are located near an outer peripheral end of the wound electrode group 1. The negative electrode terminal 6 is electrically connected to a portion of the negative electrode current collector 3a located at the outermost shell. On the other hand, the positive electrode terminal 7 is electrically connected to a portion of the positive electrode current collector 5a located at the outermost shell. The negative electrode terminal 6 and the positive electrode terminal 7 are extended outside from an opening of the bag-like container member 2. A thermoplastic resin layer is disposed on an inner surface of the bag-like container member 2, and the opening is closed by thermal fusion bonding the thermoplastic resin layer.

Hereinafter, the solid electrolyte layer, the negative electrode, the positive electrode, the electrolyte, the container member, the negative electrode terminal, and the positive electrode terminal will be described in detail.

(1) Solid Electrolyte Layer

The solid electrolyte layer is the solid electrolyte separator according to the first embodiment. Thus, the description of the matters described in the first embodiment is omitted.

The thickness of the solid electrolyte layer is, for example, within the range of 1 μm to 50 μm, preferably within the range of 3 μm to 20 μm. When the thickness of the solid electrolyte layer is within this range, internal short circuit can be suppressed, and low resistance battery characteristics can be obtained.

(2) Negative Electrode

The negative electrode may include a negative electrode current collector and a negative electrode active material-containing layer. The negative electrode active material-containing layer may be formed on both surfaces or one surface of the negative electrode current collector. The negative electrode active material-containing layer can contain a negative electrode active material, and optionally a conductive agent and a binder.

Examples of the negative electrode active material include lithium titanate having a ramsdellite structure (for example, $Li_{2+y}Ti_3O_7$, $0 \leq y \leq 3$), lithium titanate having a spinel structure (for example, $Li_{4+x}Ti_5O_{12}$, $0 \leq x \leq 3$), monoclinic titanium dioxide ($TiO_2$), anatase type titanium dioxide, rutile type titanium dioxide, hollandite type titanium composite oxide, orthorhombic titanium-containing composite oxide, and monoclinic niobium titanium composite oxide.

Examples of the orthorhombic titanium-containing composite oxide include a compound represented by $Li_{2-a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

Examples of the monoclinic niobium titanium composite oxide include a compound represented by $Li_x Ti_{1-y}M1_1Nb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y < 1$, $0 \leq z < 2$, and $-0.3 \leq \delta \leq 0.3$. Specific examples of the monoclinic niobium titanium composite oxide include $Li_xNb_2TiO_7$ ($0 \leq x \leq 5$).

Another example of the monoclinic niobium titanium composite oxide is a compound represented by $Ti_{1-y}M3_{y+z}Nb_{2-z}O_{7-\delta}$. Here, M3 is at least one selected from Mg, Fe, Ni, Co, W, Ta, and Mo. The respective subscripts in the composition formula are specified as follows: $0 \leq y < 1$, $0 \leq z \leq 2$, and $-0.3 \leq \delta \leq 0.3$.

A conductive agent is added in order to increase the current-collecting performance and to suppress the contact resistance between the active material and the current collector. Examples of the conductive agent include carbonaceous materials such as vapor grown carbon fiber (VGCF), carbon black such as acetylene black, and graphite. The conductive agents may be used alone or as a mixture of two or more kinds. Alternatively, instead of using the conductive agent, carbon coating or electron conductive inorganic material coating may be performed on surfaces of the active material particles.

A binder is added in order to fill a gap between dispersed active materials and to bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of CMC. The binders may be used alone or as a mixture of two or more kinds.

A compounding ratio of the negative electrode active material, the conductive agent and the binder in the negative electrode active material-containing layer can be appropriately changed according to the application of the negative electrode. It is preferable that the negative electrode active material, the conductive agent, and the binder are respectively added in a proportion within a range of 68% by mass to 96% by mass, 2% by mass to 30% by mass, and 2% by mass to 30% by mass. When the content of the conductive agent is not less than 2% by mass, the current-collecting performance of the negative electrode active material-containing layer can be improved. In addition, when the content of the binder is not less than 2% by mass, the binding property between the negative electrode active material-containing layer and the current collector is sufficient, and the excellent cycle performance can be expected. On the other hand, in order to make the capacity higher, it is preferable that the contents of the conductive agent and the binder are respectively not more than 30% by mass.

The negative electrode current collector is formed of a material which is electrochemically stable at a potential where lithium (Li) is inserted into and extracted from the active material. For example, the current collector is preferably formed of copper, nickel, stainless steel or aluminum, or aluminum alloy containing one or more elements selected from Mg, Ti, Zn, Mn, Fe, Cu, and Si. The thickness of the current collector is preferably 5 μm to 20 μm. The current collector having such a thickness can keep the balance between the strength of the electrode and light-weight performance.

The negative electrode current collector may include a portion where the negative electrode active material-containing layer is not formed on a surface of the negative electrode current collector. This portion can serve as a negative electrode tab.

The density of the negative electrode active material-containing layer (not including the current collector) is preferably 1.8 g/cm$^3$ to 2.8 g/cm$^3$. The negative electrode, in which the density of the negative electrode active material-containing layer is within this range, is excellent in terms of energy density and holding property of the electrolyte. The density of the negative electrode active material-containing layer is more preferably 2.1 g/cm$^3$ to 2.6 g/cm$^3$.

The negative electrode can be produced by the following method, for example. First, a slurry is prepared by suspending a negative electrode active material, a conductive agent and a binder in a solvent. This slurry is applied onto both surfaces or one surface of the negative electrode current collector. Then, the coated slurry is dried to obtain a laminate of the negative electrode active material-containing layer and the negative electrode current collector. Thereafter, this laminate is pressed. In this way, a negative electrode is produced.

Alternatively, the negative electrode may be produced by the following method. First, a negative electrode active material, a conductive agent and a binder are mixed to obtain a mixture. Then, the mixture is formed into pellets. Subsequently, by arranging these pellets on the negative electrode current collector, a negative electrode can be obtained.

(3) Positive Electrode

The positive electrode can include a positive electrode current collector and a positive electrode active material-containing layer. The positive electrode active material-containing layer may be formed on both surfaces or one surface of the positive electrode current collector. The positive electrode active material-containing layer can contain a positive electrode active material, and optionally a conductive agent and a binder.

As the positive electrode active material, an oxide or a sulfide can be used for example. The positive electrode may contain only one kind of compound as a positive electrode active material, or may contain a combination of two or more kinds of compounds. Examples of oxides and sulfides include compounds capable of having lithium or lithium ions to be inserted thereinto and extracted therefrom.

Examples of such compounds include manganese dioxide ($MnO_2$), iron oxide, copper oxide, nickel oxide, lithium manganese composite oxide (e.g. $Li_xMn_2O_4$ or $Li_xMnO_2$; $0<x\leq1$), lithium nickel composite oxide (e.g. $Li_xNiO_2$; $0<x\leq1$), lithium cobalt composite oxide (e.g. $Li_xCoO_2$; $0<x\leq1$), lithium nickel cobalt composite oxide (e.g. $Li_xNi_{1-y}Co_yO_2$; $0<x\leq1$, $0<y<1$), lithium manganese cobalt composite oxide (e.g. $Li_xMn_yCo_{1-y}O_2$; $0<x\leq1$, $0<y<1$), lithium manganese nickel composite oxide having a spinel structure (e.g. $Li_xMn_{2-y}Ni_yO_4$; $0<x\leq1$, $0<y<2$), lithium phosphorus oxide having an olivine structure (e.g. $Li_xFePO_4$; $0<x\leq1$; $Li_xFe_{1-y}Mn_yPO_4$; $0<x\leq1$, $0<y<1$, $Li_xCoPO_4$; $0<x\leq1$), iron sulfate ($Fe_2(SO_4)_3$), vanadium oxide (e.g. $V_2O_5$), and lithium nickel cobalt manganese composite oxide ($Li_xNi_{1-x-y}Co_xMn_yO_2$; $0<x\leq1$, $0<y<1$, $0<z<1$, $y+z<1$).

Among them, examples of more preferable compounds as the positive electrode active material include lithium manganese composite oxide having a spinel structure (e.g. $Li_xMn_2O_4$; $0<x\leq1$), lithium nickel composite oxide (e.g. $Li_xNiO_2$; $0<x\leq1$), lithium cobalt composite oxide (e.g. $Li_xCoO_2$; $0<x\leq1$), lithium nickel cobalt composite oxide (e.g. $Li_xNi_{1-y}Co_yO_2$; $0<x\leq1$, $0<y<1$), lithium manganese nickel composite oxide having a spinel structure (e.g. $Li_xMn_{2-y}Ni_yO_4$; $0<x\leq1$, $0<y<2$), lithium manganese cobalt composite oxide (e.g. $Li_xMn_yCo_{1-y}O_2$; $0<x\leq1$, $0<y<1$), lithium iron phosphate (e.g. $Li_xFePO_4$; $0<x\leq1$), and lithium nickel cobalt manganese composite oxide ($Li_xNi_{1-x-y}Co_xMn_yO_2$; $0<x\leq1$, $0<y<1$, $0<z<1$, $y+z<1$). When these compounds are used as the positive electrode active material, a positive electrode potential can be increased.

When an room temperature molten salt is used as the electrolyte of the battery, it is preferable to use a positive electrode active material containing lithium iron phosphate, $Li_xNPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details of the room temperature molten salt will be described later.

A primary particle size of the positive electrode active material is preferably 100 nm to 1 μm. The positive electrode active material having a primary particle size of not less than 100 nm is easy to handle during industrial production. In the positive electrode active material having a primary particle size of not more than 1 μm, diffusion of lithium ions within solid can proceed smoothly.

The specific surface area of the positive electrode active material is preferably 0.1 m²/g to 10 m²/g. The positive electrode active material having a specific surface area of not less than 0.1 m²/g can secure sufficient sites allowing lithium ions be inserted and extracted. The positive electrode active material having a specific surface area of not more than 10 m²/g is easy to handle during industrial production, and can secure a good charge-and-discharge cycle performance.

A binder is added in order to fill a gap between dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compound, imide compound, carboxymethyl cellulose (CMC), and salts of CMC. The binders may be used alone or as a mixture of two or more kinds.

A conductive agent is added in order to increase the current-collecting performance and to suppress the contact resistance between the positive electrode active material and the positive electrode current collector. Examples of the conductive agent include carbonaceous materials such as vapor grown carbon fiber (VGCF), carbon black such as acetylene black, and graphite. The conductive agents may be used alone or as a mixture of two or more kinds. The conductive agent may be omitted.

It is preferable that the positive electrode active material and the binder in the positive electrode active material-containing layer are respectively added in a proportion within a range of 80% by mass to 98% by mass and 2% by mass to 20% by mass.

When the content of the binder is 2% by mass or more, sufficient electrode strength can be obtained. The binder can function as an insulator. Thus, when the content of the binder is not more than 20% by mass, the content of an insulator included in the electrode is reduced, and thus, internal resistance can be reduced.

If the conductive agent is added, it is preferable that the positive electrode active material, the binder, and the conductive agent are respectively added in a proportion within a range of 77% by mass to 95% by mass, 2% by mass to 20% by mass, and 3% by mass to 15% by mass.

When the content of the conductive agent is 3% by mass or more, the above-described effect can be exhibited. In addition, when the content of the conductive agent is not more than 15% by mass, the ratio of the conductive agent brought into contact with the electrolyte can be reduced. When the ratio is low, decomposition of the electrolyte can be reduced under high-temperature preservation.

The positive electrode current collector is preferably an aluminum foil, or an aluminum alloy foil containing at least one element selected from Mg, Ti, Zn, Ni, Cr, Mn, Fe, Cu, and Si.

The aluminum foil or the aluminum alloy foil has preferably a range of 5 μm to 20 μm, more preferably 15 μm or less. The aluminum foil has preferably a density of 99% by mass or more. The content of the transition metal, such as iron, copper, nickel, and chromium, which is included in the aluminum foil or the aluminum alloy foil, is preferably 1% by mass or less.

The positive electrode current collector may include a portion where the positive electrode active material-containing layer is not formed on a surface of the positive electrode current collector. This portion can serve as a positive electrode tab.

The positive electrode can be produced by the following method, for example. First, a slurry is prepared by suspending a positive electrode active material, a conductive agent and a binder in a solvent. This slurry is applied onto one side or both sides of the positive electrode current collector. Then, the coated slurry is dried to obtain a laminate of the positive electrode active material-containing layer and the positive electrode current collector. Thereafter, this laminate is pressed. In this way, a positive electrode is produced.

Alternatively, the positive electrode may be produced by the following method. First, a positive electrode active material, a conductive agent and a binder are mixed to obtain a mixture. Then, the mixture is formed into pellets. Subsequently, by arranging these pellets on the positive electrode current collector, a positive electrode can be obtained.

(4) Electrolyte

As the electrolyte, a liquid nonaqueous electrolyte or gel-like nonaqueous electrolyte can be used, for example. The liquid nonaqueous electrolyte is prepared by dissolving an electrolyte salt as a solute in an organic solvent. The concentration of the electrolyte salt is preferably 0.5 mol/L to 2.5 mol/L.

Examples of the electrolyte salt may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethansulfonate ($LiCF_3SO_3$), and lithium bistrifluoromethylsulfonylimide ($LiN(CF_3SO_2)_2$), and mixtures thereof. The electrolyte salt which is not easily oxidized even at a high potential is preferable, and $LiPF_6$ is most preferable.

Examples of the organic solvent may include cyclic carbonates such as propylene carbonate (PC), ethylene carbonate (EC), and vinylene carbonate (VC); linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL), acetonitrile (AN), and sulfolane (SL). The organic solvents may be used alone or as a mixed solvent.

The gel nonaqueous electrolyte is prepared by combining a liquid nonaqueous electrolyte and a polymeric material. Examples of the polymer material include polyvinylidene fluoride (PVdF), polyacrylonitrile (PAN), polyethylene oxide (PEO), and a mixture thereof.

Alternatively, as the nonaqueous electrolyte, in addition to the liquid nonaqueous electrolyte and the gel-like nonaqueous electrolyte, an room temperature molten salt (ionic melt) including lithium ions, a polymer solid electrolyte, an inorganic solid electrolyte, or the like may be used.

The room temperature molten salt (ionic melt) refers to a compound which can exist as liquid at an room temperature (15° C. to 25° C.) in organic salts in which an organic cation and an organic anion are combined. Examples of the room temperature molten salt includes room temperature molten salts which exist as a liquid, room temperature molten salts which turn into liquid by being mixed with electrolyte salt, room temperature molten salts which turn into liquid by being dissolved in an organic solvent, and a mixture thereof. The room temperature molten salt, which is generally used in the secondary battery, has a melting point of not more than 25° C. In addition, the organic cation has generally a quaternary ammonium skeleton.

The polymer solid electrolyte is prepared by dissolving an electrolyte salt in a polymer material and solidifying it.

The inorganic solid electrolyte is a solid substance having Li ion conductivity.

The electrolyte may be an aqueous electrolyte containing water.

The aqueous electrolyte contains, for example, a solvent containing water and a lithium salt as an electrolyte salt. The aqueous electrolyte may be a gel-like aqueous electrolyte in which an aqueous electrolytic solution and a polymer material are combined. Examples of the polymer material include polyvinylidene fluoride (PVdF), polyacrilonitrile (PAN), and polyethyleneoxide (PEO).

The water-containing solvent may be pure water, or may be a mixed solution and/or a mixed solvent of water and a material other than water.

The aqueous electrolyte preferably contains 1 mol or more of water solvent (for example, the amount of water in the water-containing solvent) with respect to 1 mol of electrolyte salt that is a solute. The amount of the water solvent with respect to 1 mol of electrolyte salt is preferably 3.5 mol or more.

That the aqueous electrolyte contains water can be confirmed by GC-MS (Gas Chromatography—Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

The aqueous electrolyte is prepared, for example, by dissolving an electrolyte salt in an aqueous solvent at a concentration of 1 to 12 mol/L.

In order to suppress electrolysis of the aqueous electrolyte, LiOH, $Li_2SO_4$, or the like can be added to adjust the pH. The pH is preferably 3 to 13 and more preferably 4 to 12.

Examples of lithium salts include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bisoxalate borate). One or two or more kinds of lithium salts may be used. The aqueous electrolyte may contain a salt other than the lithium salt. Examples of the salt other than the lithium salt include $ZnSO_4$.

(5) Container Member

As a container member, a laminate film container or metallic container may be used, for example.

The thickness of the laminate film is, for example, 0.5 mm or less, preferably 0.2 mm or less.

As the laminate film, a multilayer film including plural resin layers and a metal layer interposed between the resin layers is used. The resin layer contains a polymer material such as polypropylene (PP), polyethylene (PE), nylon, and polyethylene terephthalate (PET). The metal layer is preferably formed of an aluminum foil or an aluminum alloy foil for attaining weight saving. The laminate film is sealed by thermal fusion bonding and thereby can be formed into the shape of the container member.

The thickness of a wall of the metallic container is, for example, 1 mm or less, more preferably 0.5 mm or less, and still more preferably 0.2 mm or less.

The metallic container is formed from aluminum, aluminum alloy, or the like, for example. The aluminum alloy preferably contains elements such as magnesium, zinc, and silicon. When the aluminum alloy contains transition metals such as iron, copper, nickel, and chromium, the content of the transition metals is preferably not more than 100 ppm by mass.

The shape of the container member is not particularly limited. The shape of the container member may be, for example, a flat type (thin type), a rectangular type, a cylindrical type, a coin type, a button type, or the like. The container member can be appropriately selected depending on the size of the battery and the use of the battery.

(6) Nositive Electrode Terminal

The negative electrode terminal can be formed from a material that is electrochemically stable at lithium insertion and extraction potentials of the negative active material and has a conductive property. Specifically, the material of the negative electrode terminal may include copper, nickel, stainless steel or aluminum, or aluminum alloy containing at least one element selected from Mg, Ti, Zn, Mn, Fe, Cu, and Si. It is preferable to use aluminum or aluminum ally as the material of the negative electrode terminal. In order to reduce the contact resistance between the negative electrode terminal and the negative electrode current collector, it is preferable that the negative electrode terminal is formed from the same material as that of the negative electrode current collector.

(7) Positive Electrode Terminal

The positive electrode terminal can be formed of a material which is electrically stable in a potential range (vs.$Li/Li^+$) where the potential with respect to an oxidation-reduction potential of lithium is 3 V to 4.5 V and has conductivity. Examples of the material of the positive electrode terminal include aluminum and aluminum alloy containing at least one element selected from the group consisting of Mg, Ti, Zn, Mn, Fe, Cu, and Si. The positive electrode terminal is preferably formed of the same material as that of the positive electrode current collector in order to reduce the contact resistance with the positive electrode current collector.

(Method of Manufacturing Secondary Battery)

The secondary battery according to the embodiment can be manufactured, for example, as described below.

First, a negative electrode having active material-containing layers on both surfaces of a current collector and a positive electrode having active material-containing layers on both surfaces of a current collector are produced. Then, the sheet-like positive electrode is punched in the thickness direction such that a contour of a portion excluding a tab portion is rectangular. In addition, the sheet-like negative electrode is punched in the thickness direction such that a contour of a portion excluding a tab portion is rectangular. At this time, as an example, punching is performed such that the dimension of the long side and the dimension of the short side of the negative electrode are larger than the dimension of the long side and the dimension of the short side of the positive electrode.

Thereafter, inorganic compound particles as the material of the peripheral edge region of the solid electrolyte layer and a binder are dispersed in an appropriate solvent such as N-methyl-2-pyrrolidone (NMP) to prepare a first slurry. The first slurry is sprayed onto the peripheral edge region of the negative electrode active material-containing layer. After the spray coating, this slurry is dried, whereby a first portion as a part of the solid electrolyte layer is formed on the negative electrode active material-containing layer. This first portion is formed in the peripheral edge region corresponding to a difference in dimension between the negative electrode and the positive electrode in the solid electrolyte layer.

Then, a second slurry is prepared by dispersing solid electrolyte particles having higher ion conductivity than that of the material of the peripheral edge region of the solid electrolyte layer and a binder in an appropriate solvent. The second slurry is sprayed onto a region more inside than the first portion of the solid electrolyte layer previously formed on the negative electrode active material-containing layer. After the spray coating, this slurry is dried, whereby a second portion as a part of the solid electrolyte layer is formed on the negative electrode active material-containing layer. The second portion is formed in the central region corresponding to the width of the positive electrode in the solid electrolyte layer.

The method of coating a slurry is not limited to spray coating, and may be a method such as gravure printing, spray deposition method, slot die method, micro gravure printing, electrospinning, applying using brush, or dip coating. The slurry may be coated by only one of these coating methods or a combination of plural kinds of coating methods.

The solid electrolyte layer is also formed on the other surface of the negative electrode in the same procedure as described above. In this way, a laminate of the negative electrode in which the solid electrolyte layers are formed on one surface and the other surface is obtained.

Plural of the laminates are produced, and the laminates and the positive electrode are stacked while interposing the positive electrode between the laminates, whereby a secondary battery can be manufactured. The solid electrolyte layer included in the secondary battery includes a first portion including a surface in contact with the negative electrode and a second portion including a surface in contact with the negative electrode and a surface in contact with the positive electrode, and the lithium ion conductivity of the first portion is lower than the lithium ion conductivity of the second portion.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

Figure 12:
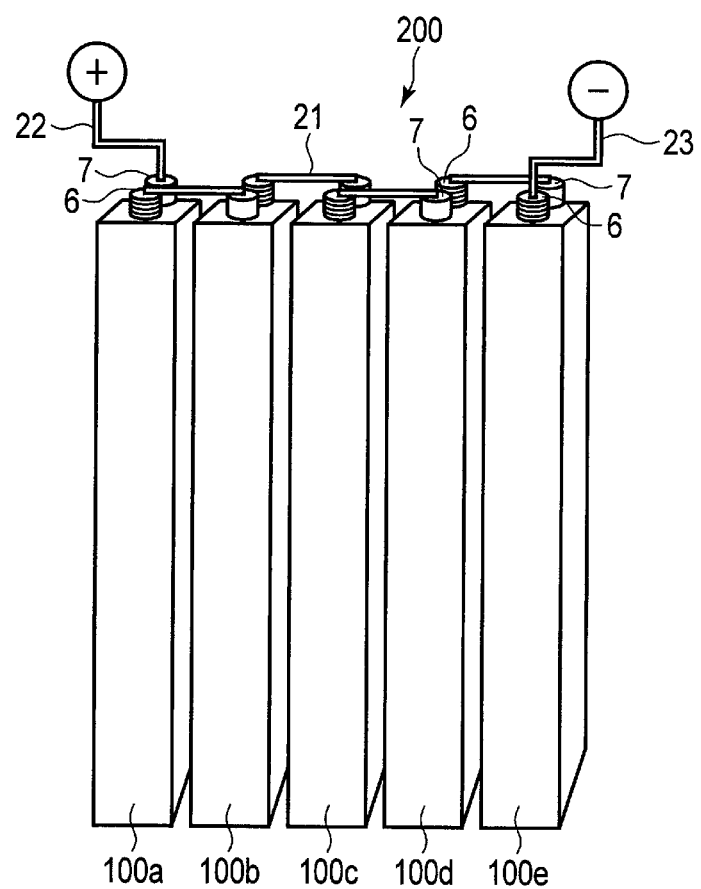
FIG. 12 is a perspective view schematically showing an example of a battery module according to the second embodiment.

FIG. 12 is a perspective view schematically showing an example of the battery module according to the embodiment. The battery module 200 shown in FIG. 12 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 12 is a battery module of five in-series connection.

As shown in FIG. 12, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

The secondary battery according to the second embodiment includes a first electrode which is one of a positive electrode and a negative electrode, a second electrode which is the other of the positive electrode and the negative electrode, and a solid electrolyte layer which is the solid electrolyte separator according to the first embodiment. Thus, this secondary battery is excellent in cycle life performance.

Third Embodiment

According to a third embodiment, a battery pack is provided. The battery pack includes the secondary battery according to the second embodiment. The battery pack includes one secondary battery according to the first embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 13:
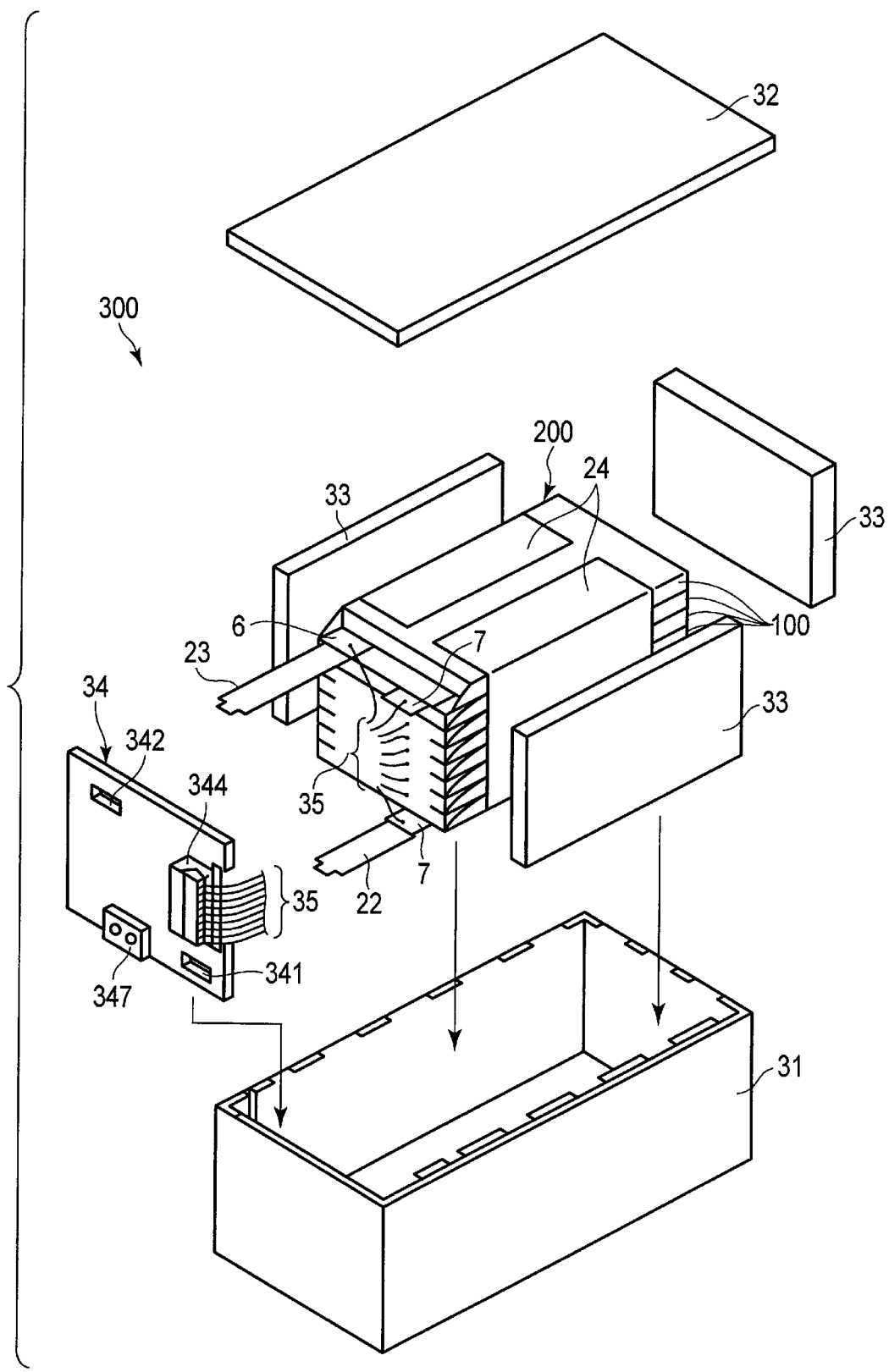
FIG. 13 is an exploded perspective view schematically showing an example of a battery pack according to the third embodiment.

FIG. 13 is an exploded perspective view schematically showing an example of the battery pack according to the embodiment. FIG. 14 is a block diagram showing an example of an electric circuit of the battery pack shown in FIG. 13.

A battery pack 300 shown in FIGS. 13 and 14 includes a housing container 31, a lid 32, protective sheets 33, a battery module 200, a printed wiring board 34, wires 35, and an insulating plate (not shown).

A housing container 31 shown in FIG. 13 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural battery cells 100, a positive electrode-side lead 22, a negative electrode-side lead 23, and an adhesive tape 24.

The battery cell 100 has, for example, a structure shown in FIGS. 10 and 11. At least one of the plural battery cells 100 is a secondary battery according to the second embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 14. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment includes the secondary battery according to the second embodiment. Thus, this battery pack is excellent in cycle life characteristics.

Fourth Embodiment

According to a fourth embodiment, a vehicle is provided. The vehicle is equipped with the battery pack according to the third embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

FIG. 15 is a sectional view schematically showing an example of a vehicle according to the embodiment.

The vehicle 400 shown in FIG. 15 includes a vehicle body 40 and a battery pack 300 according to the third embodiment. The vehicle 400 shown in FIG. 15 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 15, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, with reference to FIG. 16, an aspect of operation of the vehicle according to the embodiment is explained.

FIG. 16 is a view schematically showing an example of the vehicle according to the embodiment. A vehicle 400, shown in FIG. 16, is an electric automobile.

The vehicle 400, shown in FIG. 16, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 16, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 16) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

A vehicle according to the fourth embodiment includes the battery pack according to the third embodiment. Therefore, according to the present embodiment, it is possible to provide the vehicle equipped with the battery pack capable of achieving the excellent cycle life characteristics.

EXAMPLES

Examples are explained below, but the embodiments are not limited to Examples described below.

Example 1

<Production of Positive Electrode>

90% by weight of a lithium cobalt oxide ($LiCoO_2$) powder as a positive electrode active material, 5% by weight of acetylene black as a conductive agent, and 5% by weight of polyvinylidene fluoride (PVdF) as a binder were prepared, and they were added to N-methyl-2-pyrrolidone (NMP) as a dispersion solvent and mixed to prepare a slurry. The slurry was applied on both surfaces of a current collector formed from an aluminum foil having a thickness of 12 μm and was then dried and pressed to produce a positive electrode including an active material layer. Thereafter, the positive electrode was cut out such that a contour of a principal surface of the active material layer was a rectangle having a size of 70 mm×50 mm. However, the current collector included in this positive electrode had a tab portion having no active material layer.

<Production of Negative Electrode>

90% by weight of a lithium titanium composite oxide ($Li_4Ti_5O_{12}$) powder as a negative electrode active material, 5% by weight of acetylene black as a conductive agent, and 5% by weight of PVdF as a binder were provided, and they were added to NMP as a dispersion solvent and mixed to prepare a slurry. The slurry was applied on both surfaces of a current collector formed from an aluminum foil having a thickness of 12 μm and was then dried and pressed to produce a negative electrode including an active material layer. After that, the negative electrode was cut out such that a contour of a principal surface of the active material layer was a rectangle having a size of 90 mm×70 mm. However, the current collector included in this negative electrode had a tab portion having no active material layer.

<Formation of Solid Electrolyte Layer (First Portion)>

Alumina particles and cellulose acetate as a binder were weighed such that the mass ratio was 100:1, and they were mixed with NMP as a dispersion solvent to prepare a slurry.

This slurry was applied by spraying over the entire length of four sides on one surface of the negative electrode (on the active material-containing layer) produced above, and dried to remove NMP, and thus to form a first portion. This first portion was formed with a width of 10 mm inside from a contour of the one surface of the negative electrode. The film thickness of the first portion was about 20 μm.

<Formation of Solid Electrolyte Layer (Second Portion)>

$Li_7La_3Zr_2O_{12}$ (LLZ) particles and cellulose acetate as a binder were weighed such that the mass ratio was 100:1, and they were mixed with NMP as a dispersion solvent to prepare a slurry. This slurry was applied by spraying to an inner portion of the first portion previously formed and dried to remove the NMP, and thus to form a second portion.

<Measurement of Width>

When the width of the solid electrolyte layer along one of the in-plane directions was measured in accordance with the method described in the embodiment, the width of the positive electrode was 50 mm, the width of the negative electrode was 70 mm, and the width of the solid electrolyte layer was 70 mm. That is, the width of the central region in this one direction was 50 mm, and the width of the peripheral edge region was 20 mm. A total width of the first portion in this one direction was 20 mm, and the width of the second portion was 50 mm.

The proportion of the total width of the first portion to the width of the solid electrolyte layer was about 29%. In the solid electrolyte layer, the total width of the first portion overlapping the positive electrode to the width of the positive electrode was 0%.

<Measurement of Lithium Ion Conductivity>

When the lithium ion conductivities in the central region and the peripheral edge region were measured in accordance with the method described in the first embodiment, the lithium ion conductivity in the central region was $3\times10^{-4}$ S/cm, and the lithium ion conductivity in the peripheral edge region was $2\times10^{-14}$ S/cm.

<Production of Laminate Cell>

The negative electrode having the solid electrolyte layer stacked thereon and the positive electrode were vacuum-dried and then stacked such that the positive electrode was interposed between the two negative electrodes, whereby an electrode group was produced. At this time, stacking was performed such that the solid electrolyte layer of each negative electrode was in contact with the positive electrode. The obtained electrode group had the structure described with reference to FIGS. 4 and 5. The obtained electrode group was housed in a pack formed with an aluminum film, which had a thickness of 0.1 mm and was configured by an aluminum foil having a thickness of 40 μm and polypropylene layers formed on both sides of the aluminum foil, and was vacuum-dried at 120° C. for 24 hours. After that, a nonaqueous electrolyte was prepared by dissolving 1.2 mol/L of $LiPF_6$ as an electrolyte salt in a mixed solvent of polycarbonate and diethyl carbonate (volume ratio of 1:2). After a nonaqueous electrolyte was injected into a laminate film pack that housed the electrode group, the pack was completely sealed by heat seal to produce a laminate cell.

<Cycle-Life Evaluation>

The laminate cell produced above was left to stand in a stationary state in a thermostatic bath of 45° C., and charge-and-discharge cycle characteristics were evaluated. In a cycle test, a capacity retention ratio was calculated from an initial discharge capacity at a first cycle and a discharge capacity at 500 cycles when a charge at 1 C and a discharge at 1 C in a voltage range of 1.5 V to 3.0 V were set as a 1 cycle. Then, when the capacity retention ratio of a laminate cell according to a reference example to be described later was set to be 100, a ratio of the capacity retention ratio of each of the laminate cells according to Examples to the capacity retention ratio of the reference example was calculated.

The above results are summarized in Tables 1 and 2 below. Tables 1 and 2 also show results of Examples 2 to 13, the reference example, and a comparative example to be described later.

In Table 1, the total width of the first portion measured according to the first embodiment is described in the column of "first portion". The total width also referred to be the total value of the two or more of the first portion. In a case where an orthogonal projection of the first portion with respect to a principal surface of the solid electrolyte layer overlaps the positive electrode, a value obtained by dividing the total width of the first portion by the width of the positive electrode is described in the column of "first portion overlapping positive electrode/positive electrode" described as the ratio of the width. Accordingly, when the orthogonal projection of the first portion with respect to the principal surface of the solid electrolyte layer does not overlap the positive electrode, the value of "first portion overlapping positive electrode/positive electrode" is 0 (zero).

In Table 2, the column of "capacity retention ratio" describes the value of the capacity retention ratio calculated by the cycle-life evaluation described above.

Example 2

A nonaqueous electrolyte secondary battery was produced in the same manner as described in Example 1 except that the first portion included in the peripheral edge region of the solid electrolyte layer was formed with a width of 5 mm inside from the contour of one surface of the negative electrode, and the nonaqueous electrolyte secondary battery was then evaluated.

Example 3

A nonaqueous electrolyte secondary battery was produced in the same manner as described in Example 1 except that the first portion included in the peripheral edge region of the solid electrolyte layer was formed with a width of 13 mm inside from the contour of one surface of the negative electrode, and the nonaqueous electrolyte secondary battery was then evaluated.

Example 4

A nonaqueous electrolyte secondary battery was produced in the same manner as described in Example 1 except that the first portion included in the peripheral edge region of the solid electrolyte layer was formed from a position inside by 3 mm from the contour of one surface of the negative electrode to a position more inside by 10 mm, and the nonaqueous electrolyte secondary battery was then evaluated. The orthogonal projection of the first portion to the principal surface of the solid electrolyte layer did not overlap the positive electrode.

Example 5

A nonaqueous electrolyte secondary battery was produced in the same manner as described in Example 1 except for the following processes and then evaluated.

That is, in Example 5, when the negative electrode was produced, on two sides on the negative electrode active material layer of a first side having a tab portion and a second side facing the first side, the first portion included in the solid electrolyte layer was formed with a width of 10 mm inside from a contour of the negative electrode active material layer. No solid electrolyte layer was formed in a negative electrode tab portion.

Example 6

A nonaqueous electrolyte secondary battery was produced in the same manner as described in Example 1 except for the following processes and then evaluated.

That is, in Example 6, when the negative electrode was produced, on the negative electrode active material layer of two opposing sides having no tab portion, the first portion included in the solid electrolyte layer was formed with a width of 10 mm inside from the contour of the negative electrode active material layer.

Example 7

A nonaqueous electrolyte secondary battery was produced in the same manner as described in Example 1 except that $Li_{2.9}PO_{3.3}N_{0.46}$ (LIPON) particles were used when the peripheral edge region of the solid electrolyte layer was formed, and the nonaqueous electrolyte secondary battery was then evaluated.

Example 8

A nonaqueous electrolyte secondary battery was produced in the same manner as described in Example 5 except that the first portion of the solid electrolyte layer was formed by micro gravure coating, and the nonaqueous electrolyte secondary battery was then evaluated.

Example 9

A nonaqueous electrolyte secondary battery was produced in the same manner as described in Example 1 except that the first portion included in the peripheral edge region of the solid electrolyte layer was formed from a position inside by 8 mm from the contour of one surface of the negative electrode to a position more inside by 2 mm, and the nonaqueous electrolyte secondary battery was then evaluated.

Example 10

A nonaqueous electrolyte secondary battery was produced in the same manner as described in Example 1 except that the nonaqueous electrolyte secondary battery was produced as follows, and the nonaqueous electrolyte secondary battery was then evaluated.

That is, the first portion of the solid electrolyte layer was formed from a position inside by 12 mm from the contour of one surface of the negative electrode to a position more inside by 10 mm. After that, the second portion was formed inside the first portion previously formed.

The solid electrolyte layer included in the produced nonaqueous electrolyte secondary battery had a smaller width along one of the in-plane directions than the positive electrode. The entire orthogonal projections of this solid electrolyte layer with respect to the positive electrode overlapped the positive electrode. That is, the solid electrolyte layer contained in the nonaqueous electrolyte secondary battery according to Example 10 contained no peripheral edge region but contained only the central region.

Example 11

A nonaqueous electrolyte secondary battery was produced in the same manner as described in Example 1 except that the first portion included in the peripheral edge region of the solid electrolyte layer was formed with a width of 30 mm inside from the contour of one surface of the negative electrode, and the nonaqueous electrolyte secondary battery was then evaluated.

Example 12

A nonaqueous electrolyte secondary battery was produced in the same manner as described in Example 1 except that an orthorhombic titanium-containing composite oxide ($Li_2Na_2Ti_6O_{14}$) was used as the negative electrode active material, and the nonaqueous electrolyte secondary battery was then evaluated.

Example 13

A nonaqueous electrolyte secondary battery was produced in the same manner as described in Example 1 except that a monoclinic niobium titanium composite oxide ($Nb_2TiO_7$) was used as the negative electrode active material, and the nonaqueous electrolyte secondary battery was then evaluated.

Reference Example

A nonaqueous electrolyte secondary battery was produced in the same manner as described in Example 1 except for the following processes and then evaluated.

When the solid electrolyte layer was produced, $Li_7La_3Zr_2O_{12}$ (LLZ) particles and cellulose acetate as a binder were weighed such that the mass ratio was 100:1, and they were mixed with NMP as a dispersion solvent to prepare a slurry. This slurry was applied by spraying onto the entire surface of one side of the negative electrode previously formed and dried to remove the NMP, and thus to form the solid electrolyte layer. That is, the solid electrolyte layer of the nonaqueous electrolyte secondary battery according to this reference example did not include the first portion because the central region and the peripheral edge region were formed of the same material.

Comparative Example

A nonaqueous electrolyte secondary battery was produced in the same manner as described in Example 1 except that LLZ particles were used when the first portion of the solid electrolyte layer was formed, and alumina particles were used when the second portion of the solid electrolyte layer was formed, the nonaqueous electrolyte secondary battery was then evaluated.

TABLE 1

| | Width (mm) | | | | | | | Proportion of width (%) | | |
| --- | --- | --- | --- | --- | --- | --- | --- | --- | --- | --- |
| | Positive electrode | Negative electrode | Solid electrolyte layer | Central region | Peripheral edge region | First portion | Second portion | First portion/ Solid electrolyte layer | First portion overlapping positive electrode/ positive electrode | First portion existence position |
| Example 1 | 50 | 70 | 70 | 50 | 20 | 20 | 50 | 29 | 0 | All four sides of solid electrolyte layer |
| Example 2 | 50 | 70 | 70 | 50 | 20 | 10 | 60 | 14 | 0 | All four sides of solid electrolyte layer |
| Example 3 | 50 | 70 | 70 | 50 | 20 | 26 | 44 | 37 | 12 | All four sides of solid electrolyte layer |
| Example 4 | 50 | 70 | 64 | 50 | 14 | 14 | 50 | 22 | 0 | All four sides of solid electrolyte layer |
| Example 5 | 50 | 70 | 70 | 50 | 20 | 20 | 50 | 29 | 0 | Two opposing sides including side having tab |
| Example 6 | 50 | 70 | 70 | 50 | 20 | 20 | 50 | 29 | 0 | Two opposing sides including side not having tab |
| Example 7 | 50 | 70 | 70 | 50 | 20 | 20 | 50 | 29 | 0 | All four sides of solid electrolyte layer |
| Example 8 | 50 | 70 | 70 | 50 | 20 | 20 | 50 | 29 | 0 | All four sides of solid electrolyte layer |
| Example 9 | 50 | 70 | 54 | 50 | 4 | 4 | 50 | 7 | 0 | All four sides of solid electrolyte layer |
| Example 10 | 50 | 70 | 46 | 46 | — | 20 | 26 | 43 | 40 | Only in central region |
| Example 11 | 50 | 70 | 70 | 50 | 20 | 60 | 10 | 86 | 80 | All four sides of solid electrolyte layer |
| Example 12 | 50 | 70 | 70 | 50 | 20 | 20 | 50 | 29 | 0 | All four sides of solid electrolyte layer |
| Example 13 | 50 | 70 | 70 | 50 | 20 | 20 | 50 | 29 | 0 | All four sides of solid electrolyte layer |
| Reference example | 50 | 70 | 70 | 50 | 20 | — | — | 0 | 0 | Nothing |
| Comparative example | 50 | 70 | 70 | 50 | 20 | 20 | 50 | 29 | 0 | Only in central region |

TABLE 2

| | Coating method | Material of first portion | Material of second portion | Lithium ion conductivity in central region (S/cm) | Lithium ion conductivity in peripheral edge region (S/cm) | Capacity retention ratio |
|---|---|---|---|---|---|---|
| Example 1 | Spray coating | Alumina | LLZ | $3 \times 10^{-4}$ | $2 \times 10^{-14}$ | 113 |
| Example 2 | Spray coating | Alumina | LLZ | $3 \times 10^{-4}$ | $2 \times 10^{-14}$ | 108 |
| Example 3 | Spray coating | Alumina | LLZ | $3 \times 10^{-4}$ | $2 \times 10^{-14}$ | 110 |
| Example 4 | Spray coating | Alumina | LLZ | $3 \times 10^{-4}$ | $2 \times 10^{-14}$ | 108 |
| Example 5 | Spray coating | Alumina | LLZ | $3 \times 10^{-4}$ | $2 \times 10^{-14}$ | 106 |
| Example 6 | Spray coating | Alumina | LLZ | $3 \times 10^{-4}$ | $2 \times 10^{-14}$ | 107 |
| Example 7 | Spray coating | $Li_{2.9}PO_{3.3}N_{0.46}$ | LLZ | $3 \times 10^{-4}$ | $4 \times 10^{-6}$ | 104 |
| Example 8 | Micro gravure coating & spray coating | Alumina | LLZ | $3 \times 10^{-4}$ | $2 \times 10^{-14}$ | 105 |
| Example 9 | Spray coating | Alumina | LLZ | $3 \times 10^{-4}$ | $2 \times 10^{-14}$ | 102 |
| Example 10 | Spray coating | Alumina | LLZ | $3 \times 10^{-4}$ | No peripheral edge region | 94 |
| Example 11 | Spray coating | Alumina | LLZ | $3 \times 10^{-4}$ | $2 \times 10^{-14}$ | 93 |
| Example 12 | Spray coating | Alumina | LLZ | $3 \times 10^{-4}$ | $2 \times 10^{-14}$ | 110 |
| Example 13 | Spray coating | Alumina | LLZ | $3 \times 10^{-4}$ | $2 \times 10^{-14}$ | 115 |
| Reference example | Spray coating | — | LLZ | $3 \times 10^{-4}$ | $3 \times 10^{-4}$ | 100 |
| Comparative example | Spray coating | LLZ | Alumina | $2 \times 10^{-14}$ | $3 \times 10^{-4}$ | 90 |

As is clear from the comparison between Examples and the comparative example, the peripheral edge region of the solid electrolyte layer includes the first portion in contact with the negative electrode, the central region includes the second portion in contact with the negative electrode and the positive electrode, and when the lithium ion conductivity of the first portion is lower than the lithium ion conductivity of the second portion, the capacity retention ratio is excellent.

For example, when comparing Example 1 with Example 3, Example 1 in which the ratio of the total width of the first portion to the width of the solid electrolyte layer is 29% shows an excellent capacity retention ratio as compared with Example 3 in which the ratio is 37%.

When comparing Example 1 with Examples 5 and 6, it can be seen that there is no need for the first portion having low lithium ion conductivity to exist on the four sides of the solid electrolyte layer.

When comparing Example 9 with the reference example, Example 9 in which the ratio of the total width of the first portion to the width of the solid electrolyte layer is 7% shows an excellent capacity retention ratio as compared with the reference example in which the first portion does not exist.

The solid electrolyte layer according to Example 10 did not include the peripheral edge region corresponding to the difference between the width of the negative electrode and the width of the positive electrode. However, the solid electrolyte layer according to Example 10 included both the first portion and the second portion in the central region.

For Example 11, the width of the positive electrode was smaller than the total width of the first portion.

The capacity retention ratios of Examples 10 and 11 were superior to those of the comparative example.

The solid electrolyte separator according to at least one embodiment and example described above is a sheet containing a solid electrolyte having a lithium ion conductivity. A first lithium ion conductivity in a peripheral edge region along an in-plane direction is lower than a second lithium ion conductivity in the central region along the in-plane direction. Therefore, the cycle life characteristics of the secondary battery including this solid electrolyte separator are excellent.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:

a first electrode which is one of a positive electrode and a negative electrode;

a second electrode which is the other of the positive electrode and the negative electrode; and a solid electrolyte layer which is a sheet comprising a solid electrolyte having a lithium ion conductivity, wherein a first lithium ion conductivity in a peripheral edge region along an in-plane direction of the sheet is lower than a second lithium ion conductivity in a central region along the in-plane direction of the sheet, wherein the solid electrolyte layer has a first surface and a second surface facing the first surface, at least a portion of the first surface is in contact with the first electrode, at least a portion of the second surface is in contact with the second electrode, a width of the first electrode along each direction of in-plane direction of the sheet is larger than a width of the second electrode along the each direction, the peripheral edge region is a region corresponding to a difference between the width of the first electrode and the width of the second electrode and comprises a first portion which comprises a surface in contact with the first electrode and located in the first surface, the central region is a region corresponding to the width of the second electrode along the each direction and comprises a second portion which comprises a surface in contact with the first electrode and located in the first surface, the second portion further comprises a surface being in contact with the second electrode and located in the second surface, and a first lithium ion conductivity of the first portion is lower than a second lithium ion conductivity of the second portion.

2. The secondary battery according to claim 1, wherein the solid electrolyte layer has a square or rectangular shape, the first portion has two or more widths along the in-plane directions of the sheet, and a width of the second electrode along the in-plane direction is larger than a total value of the two or more widths.

3. The secondary battery according to claim 1, wherein the solid electrolyte layer has a square or rectangular shape, the first portion has two or more widths along the in-plane direction of the sheet, and a ratio of a total value of the two or more widths to a width of the solid electrolyte layer along the in-plane direction is within a range of 1% to 10%.

4. The secondary battery according to claim 1, wherein the solid electrolyte layer has a square or rectangular shape, the first portion has two or more widths along the in-plane direction of the sheet, and a ratio of a total value of the two or more widths to a width of the second electrode along the in-plane direction is within a range of 0% to 20%.

5. The secondary battery according to claim 1, wherein the first lithium ion conductivity in the peripheral edge region is not more than $1 \times 10^{-10}$ S/cm, and the second lithium ion conductivity in the central region is not less than $1 \times 10^{-4}$ S/cm.

6. The secondary battery according to claim 1, wherein the negative electrode comprises a negative electrode active material, and the negative electrode active material comprises at least one selected from the group consisting of lithium titanate having a ramsdellite structure, lithium titanate having a spinel structure, monoclinic titanium dioxide, anatase type titanium dioxide, rutile type titanium dioxide, hollandite type titanium composite oxide, orthorhombic titanium-containing composite oxide, and monoclinic niobium titanium composite oxide.

7. The secondary battery according to claim 1, further comprising an electrolyte.

8. A battery pack comprising the secondary battery according to claim 1.

9. The battery pack according to claim 8, further comprising:

an external power distribution terminal; and a protective circuit.

10. The battery pack according to claim 8, comprising plural of the secondary battery, wherein the secondary batteries are electrically connected in series, in parallel, or in combination of series connection and parallel connection.

11. A vehicle comprising the battery pack according to claim 8.

12. The vehicle according to claim 11, which comprises a mechanism configured to convert kinetic energy of the vehicle into regenerative energy.

* * * * *